(12) United States Patent　　　　(10) Patent No.:　US 12,664,847 B2
Epstein　　　　　　　　　　　　　　(45) Date of Patent:　　Jun. 23, 2026

(54) MULTI-ACTIVITY VENUE AUTOMATION

(71) Applicant: Adam J. Epstein, New York, NY (US)

(72) Inventor: Adam J. Epstein, New York, NY (US)

( * ) Notice: Subject to any disclaimer, the term of this patent is extended or adjusted under 35 U.S.C. 154(b) by 0 days.

(21) Appl. No.: 19/001,009

(22) Filed: Dec. 24, 2024

(65) Prior Publication Data

US 2025/0218242 A1　　Jul. 3, 2025

Related U.S. Application Data

(63) Continuation of application No. 18/074,274, filed on Dec. 2, 2022, now Pat. No. 12,190,669, which is a
(Continued)

(51) Int. Cl.
| | |
|---|---|
| *G07C 9/28* | (2020.01) |
| *G06Q 10/02* | (2012.01) |
| *G06Q 30/0601* | (2023.01) |
| *G07C 9/20* | (2020.01) |
| *G07C 9/27* | (2020.01) |
| *G07C 11/00* | (2006.01) |

(52) U.S. Cl.
CPC .............. *G07C 9/28* (2020.01); *G06Q 10/02* (2013.01); *G06Q 30/0621* (2013.01); *G07C 9/27* (2020.01); *G07C 2011/02* (2013.01)

(58) Field of Classification Search
CPC ........ G07C 9/28; G07C 9/27; G07C 2011/02; G06Q 10/02; G06Q 30/0621; G06Q 30/06; G06Q 10/06311; G06Q 10/10; G06Q 10/109; G06Q 10/1093; G07B 15/00; G06N 5/04
See application file for complete search history.

(56) References Cited

U.S. PATENT DOCUMENTS 7,785,508 B2 *　8/2010　King ...................... C08L 23/06
264/237
8,606,644 B1　12/2013　Bruckhaus et al.
(Continued)

FOREIGN PATENT DOCUMENTS

| CN | 102971758 A | 3/2013 |
|---|---|---|
| CN | 106464829 A | 2/2017 |

(Continued)

OTHER PUBLICATIONS

English Translation of JP 2003006465 A, Jan. 10, 2003, 14 pages.
(Continued)

*Primary Examiner* — Tuyen K Vo
(74) *Attorney, Agent, or Firm* — Kilpatrick Townsend & Stockton LLP

(57) ABSTRACT

A venue automation environment is disclosed in which various forms of automation and user integration can be managed across one or more activities at one or more venues. Venue automation and integration can include automation at various stages of participant engagement including before, during, and after visiting one or more venues and participating in one or more activities at a venue. Venue automation and integration can include automated itinerary generation, activity reservation, participant identification, access control, payment managing, scoring, media capture (e.g., audio, photo, and video), and venue management.

18 Claims, 9 Drawing Sheets

Related U.S. Application Data continuation of application No. 16/646,454, filed as application No. PCT/US2018/051060 on Sep. 14, 2018, now Pat. No. 11,532,193.

(60) Provisional application No. 62/655,438, filed on Apr. 10, 2018, provisional application No. 62/655,440, filed on Apr. 10, 2018, provisional application No. 62/558,607, filed on Sep. 14, 2017.

(56) References Cited

U.S. PATENT DOCUMENTS

| | | | |
|---|---|---|---|
| 8,700,540 | B1 | 4/2014 | Zambrano et al. |
| 9,118,724 | B1 | 8/2015 | Sooriyan et al. |
| 9,545,565 | B1 | 1/2017 | Kornmann et al. |
| 9,706,253 | B1* | 7/2017 | Funk ................ H04N 21/25891 |
| 9,858,538 | B1 | 1/2018 | Johansson et al. |
| 9,916,564 | B1 | 3/2018 | Johns et al. |
| 11,532,193 | B2 | 12/2022 | Epstein |
| 12,190,669 | B2 | 1/2025 | Epstein |
| 2002/0072938 | A1 | 6/2002 | Black et al. |
| 2003/0054905 | A1 | 3/2003 | King, Jr. |
| 2004/0117219 | A1 | 6/2004 | Sugimoto et al. |
| 2004/0117638 | A1 | 6/2004 | Monroe |
| 2005/0288803 | A1 | 12/2005 | Ropp et al. |
| 2007/0197247 | A1 | 8/2007 | Inselberg |
| 2007/0279494 | A1 | 12/2007 | Aman et al. |
| 2008/0254866 | A1 | 10/2008 | Young et al. |
| 2010/0056238 | A1 | 3/2010 | Terrell |
| 2010/0182436 | A1 | 7/2010 | Boman et al. |
| 2011/0071865 | A1 | 3/2011 | Leeds et al. |
| 2011/0270663 | A1 | 11/2011 | Jones et al. |
| 2012/0022902 | A1 | 1/2012 | Gressel et al. |
| 2012/0058817 | A1 | 3/2012 | Amour |
| 2012/0188376 | A1 | 7/2012 | Chatow et al. |
| 2013/0060913 | A1 | 3/2013 | Callahan |
| 2013/0066660 | A1 | 3/2013 | Kopitzke et al. |
| 2013/0231760 | A1 | 9/2013 | Rosen et al. |
| 2014/0002663 | A1* | 1/2014 | Garland ................ H04N 7/188 |
| | | | 348/159 |
| 2014/0089960 | A1 | 3/2014 | Farah |
| 2014/0122483 | A1 | 5/2014 | Zhang et al. |
| 2014/0358632 | A1 | 12/2014 | Graff et al. |
| 2014/0379393 | A1 | 12/2014 | Bascombe |
| 2015/0081348 | A1 | 3/2015 | Avera et al. |
| 2015/0142142 | A1 | 5/2015 | Campana Aguilera et al. |
| 2015/0271631 | A1 | 9/2015 | Porter |
| 2015/0297949 | A1 | 10/2015 | Aman et al. |
| 2015/0369611 | A1 | 12/2015 | Ogishi |
| 2016/0073010 | A1 | 3/2016 | Cronin et al. |
| 2016/0125502 | A1 | 5/2016 | Byron et al. |
| 2016/0189062 | A1* | 6/2016 | Forss .................... G06Q 10/02 |
| | | | 705/5 |
| 2016/0367891 | A1* | 12/2016 | Trehan .................. A63F 13/216 |
| 2017/0177718 | A1* | 6/2017 | Loganathan ...... G06F 16/90324 |
| 2017/0200474 | A1 | 7/2017 | Gudewicz |
| 2017/0316809 | A1 | 11/2017 | Gudewicz |
| 2017/0330295 | A1 | 11/2017 | Alden et al. |
| 2018/0077440 | A1* | 3/2018 | Wadhera ............ H04N 21/8456 |
| 2018/0167656 | A1 | 6/2018 | Ortiz et al. |
| 2018/0268495 | A1 | 9/2018 | O'Connor et al. |

FOREIGN PATENT DOCUMENTS

| | | | |
|---|---|---|---|
| JP | 2003006465 | A | 1/2003 |
| WO | 2013041517 | A1 | 3/2013 |
| WO | 2015103671 | A1 | 7/2015 |
| WO | 2015120413 | A1 | 8/2015 |
| WO | 2017011811 | A1 | 1/2017 |

OTHER PUBLICATIONS

U.S. Appl. No. 16/646,454, Final Office Action, Apr. 20, 2022, 12 pages.
U.S. Appl. No. 16/646,454, Non-Final Office Action, Nov. 17, 2021, 9 pages.
U.S. Appl. No. 16/646,454 , Notice of Allowance, Aug. 10, 2022, 10 pages.
U.S. Appl. No. 18/074,274, Advisory Action, Jul. 12, 2024, 2 pages.
U.S. Appl. No. 18/074,274, Final Office Action, Mar. 7, 2024, 12 pages.
U.S. Appl. No. 18/074,274, Non-Final Office Action, Nov. 1, 2023, 9 pages.
U.S. Appl. No. 18/074,274, Notice of Allowance, Aug. 30, 2024, 8 pages.
Chinese Application No. 201880073756.5, Notice of Decision to Grant, May 23, 2024, 5 pages.
Chinese Application No. 201880073756.5, Office Action, Jul. 4, 2023, 21 pages.
Chinese Application No. 201880073756.5, Office Action, Mar. 8, 2024, 17 pages.
European Application No. 18855677.3, Extended European Search Report, Dec. 14, 2020, 10 pages.
European Application No. 18855677.3, Office Action, Dec. 11, 2023, 6 pages.
International Application No. PCT/US2018/051060, International Preliminary Report on Patentability, Mar. 26, 2020, 7 pages.
International Application No. PCT/US2018/051060, International Search Report and Written Opinion, Jan. 11, 2019, 10 pages.
International Application No. PCT/US2018/051060, Invitation to Pay Add'l Fees and Partial Search Report, Oct. 24, 2018, 2 pages.
European Application No. 18855677.3, Office Action, Oct. 9, 2025, 10 pages.
Chinese Application No. CN202410979099.8, Office Action mailed Jan. 15, 2026, 9 pages.

* cited by examiner

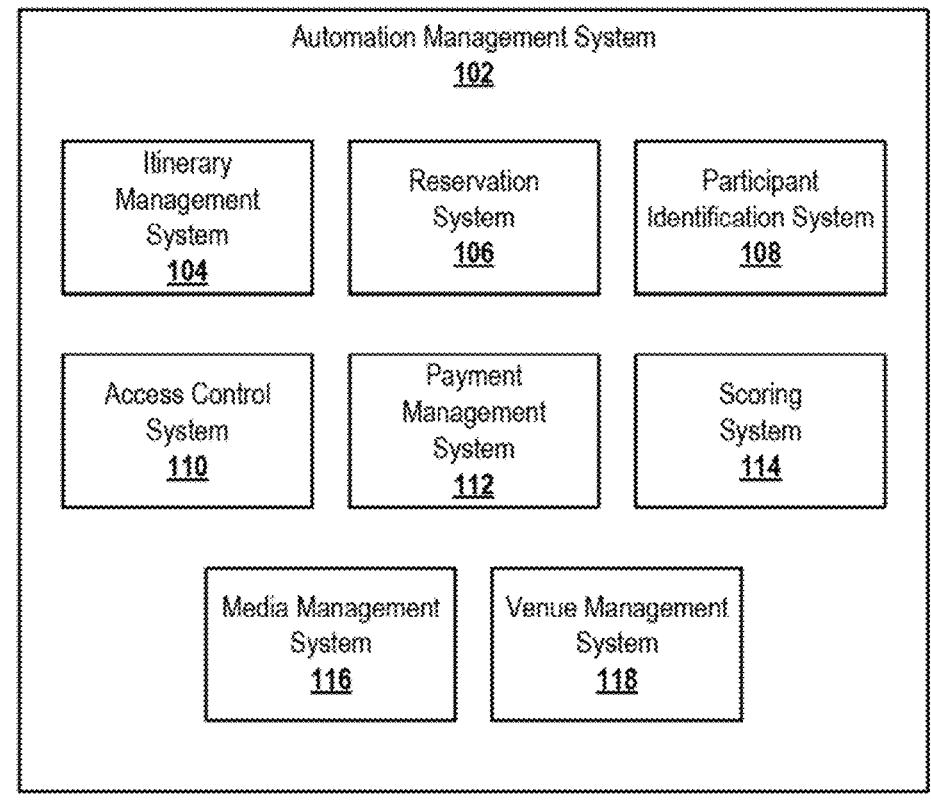
FIG. 1

Figure 3:
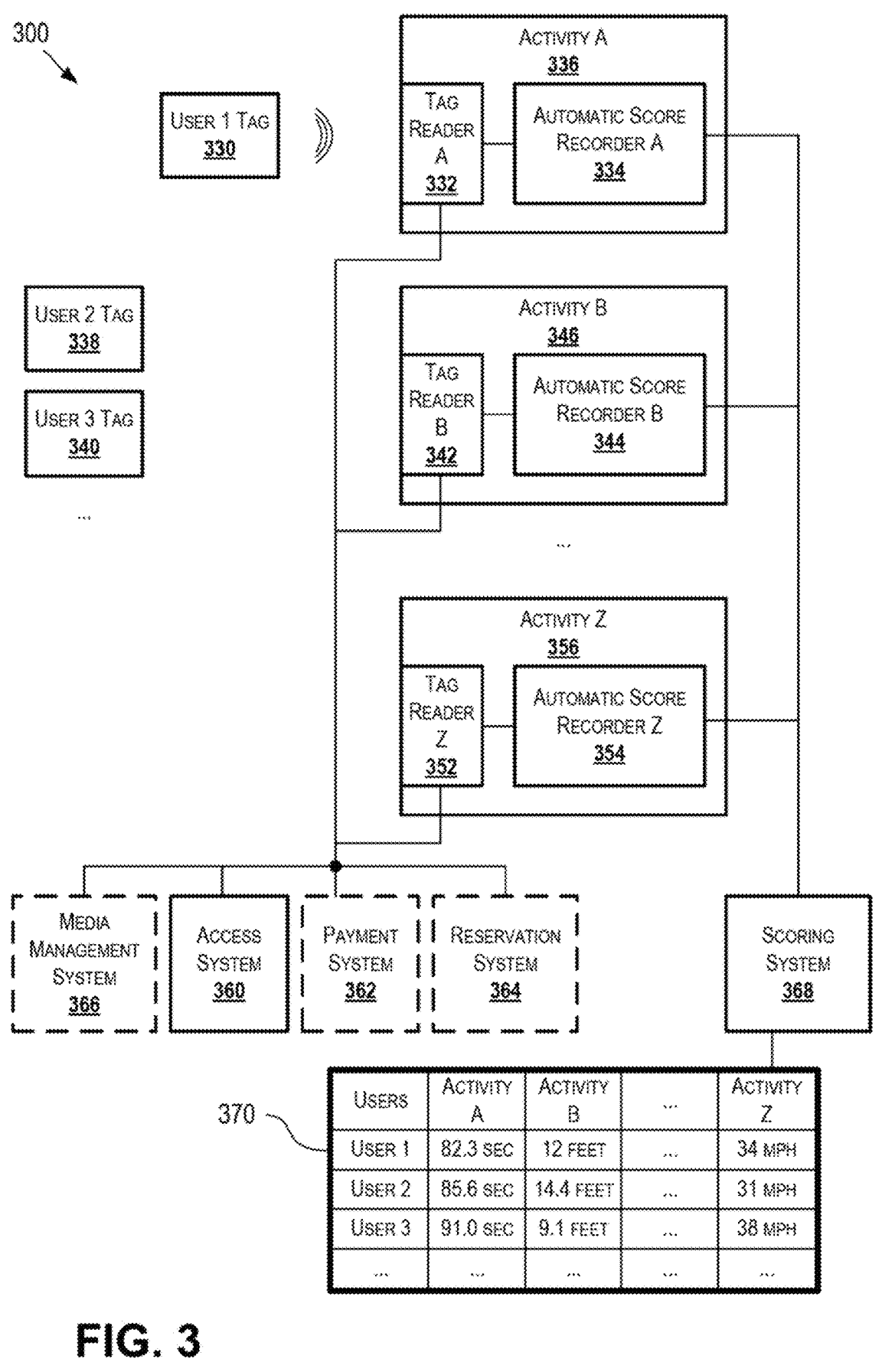

300

USER 1 TAG
330

ACTIVITY A
336

TAG READER A
332

AUTOMATIC SCORE RECORDER A
334

USER 2 TAG
338

USER 3 TAG
340

ACTIVITY B
346

TAG READER B
342

AUTOMATIC SCORE RECORDER B
344

...

ACTIVITY Z
356

TAG READER Z
352

AUTOMATIC SCORE RECORDER Z
354

MEDIA MANAGEMENT SYSTEM
366

ACCESS SYSTEM
360

PAYMENT SYSTEM
362

RESERVATION SYSTEM
364

SCORING SYSTEM
368

370

| USERS | ACTIVITY A | ACTIVITY B | ... | ACTIVITY Z |
|---|---|---|---|---|
| USER 1 | 82.3 SEC | 12 FEET | ... | 34 MPH |
| USER 2 | 85.6 SEC | 14.4 FEET | ... | 31 MPH |
| USER 3 | 91.0 SEC | 9.1 FEET | ... | 38 MPH |
| ... | ... | ... | ... | ... |

500

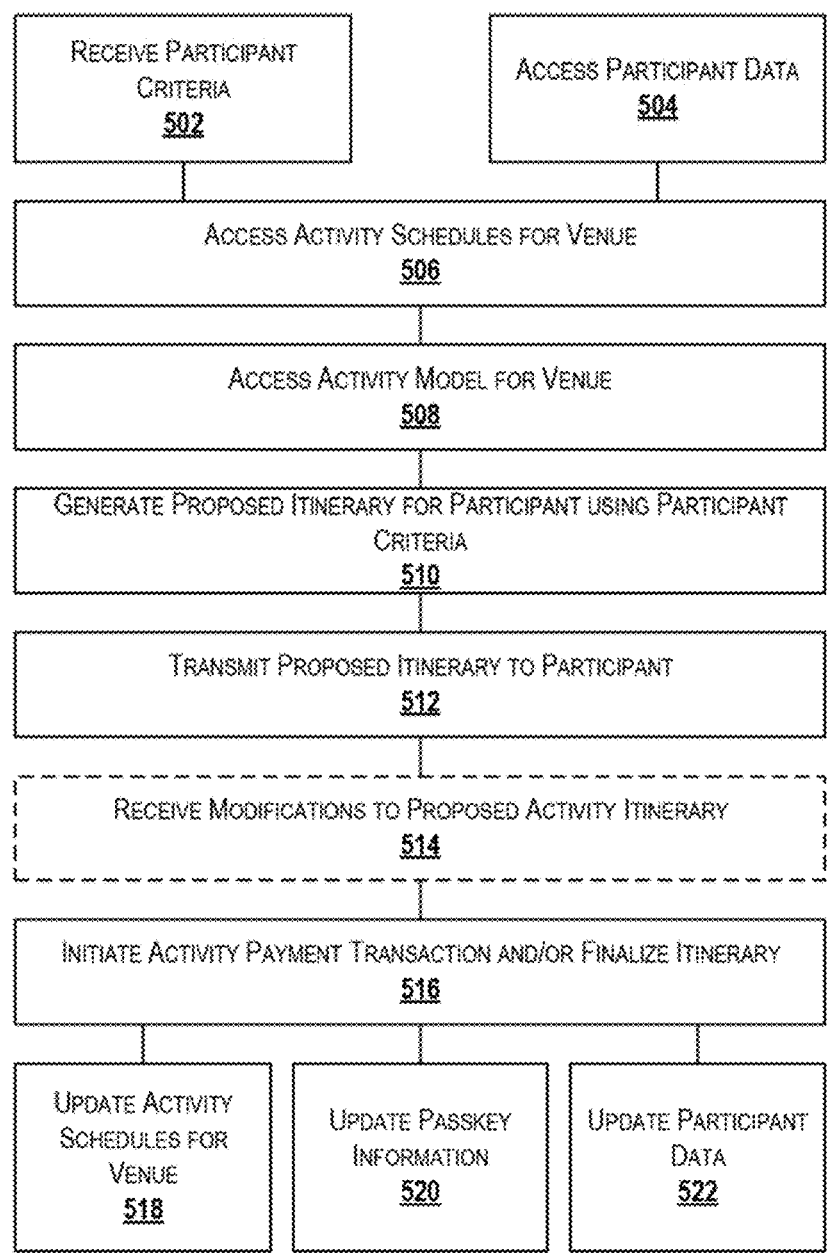

RECEIVE PARTICIPANT CRITERIA
502

ACCESS PARTICIPANT DATA
504

ACCESS ACTIVITY SCHEDULES FOR VENUE
506

ACCESS ACTIVITY MODEL FOR VENUE
508

GENERATE PROPOSED ITINERARY FOR PARTICIPANT USING PARTICIPANT CRITERIA
510

TRANSMIT PROPOSED ITINERARY TO PARTICIPANT
512

RECEIVE MODIFICATIONS TO PROPOSED ACTIVITY ITINERARY
514

INITIATE ACTIVITY PAYMENT TRANSACTION AND/OR FINALIZE ITINERARY
516

UPDATE ACTIVITY SCHEDULES FOR VENUE
518

UPDATE PASSKEY INFORMATION
520

UPDATE PARTICIPANT DATA
522

MULTI-ACTIVITY VENUE AUTOMATION

CROSS REFERENCE TO RELATED APPLICATIONS

This application is a continuation of U.S. application Ser. No. 18/074,274, filed Dec. 2, 2022, and entitled MULTI-ACTIVITY VENUE AUTOMATION, which is a continuation of U.S. application Ser. No. 16/646,454, filed Mar. 11, 2020, which is a U.S. national phase of International Application No. PCT/US2018/051060, filed Sep. 14, 2018, which claims the benefit of U.S. Patent Application No. 62/558,607 filed Sep. 14, 2017 and entitled "PARK WITH AUTOMATED EVENT ACCESS AND SCORING SYSTEM," U.S. Patent Application No. 62/655,440 filed Apr. 10, 2018 and entitled "CUSTOMIZED ITINERARY FOR MULTI-ACTIVITY VENUES," and U.S. Patent Application No. 62/655,438 filed Apr. 10, 2018 and entitled "PHOTO, VIDEO, AND DATA PACKAGE FOR MULTI-ACTIVITY VENUES," the disclosures of which are hereby incorporated by reference in their entireties.

TECHNICAL FIELD

The present disclosure relates to venues for participating in multiple sports and related activities generally and more specifically to automating aspects of participant interactions in such multi-activity venues.

BRIEF DESCRIPTION OF THE DRAWINGS

The specification makes reference to the following appended figures, in which use of like reference numerals in different figures is intended to illustrate like or analogous components.

FIG. 1 is a schematic diagram depicting a venue automation environment according to certain aspects of the present disclosure.

FIG. 3 is a schematic diagram depicting an automated event access and scoring system of a venue automation environment according to certain aspects of the present disclosure.

FIG. 5 is a flowchart depicting a process for generating an itinerary according to certain aspects of the present disclosure.

DETAILED DESCRIPTION

Figure 2:
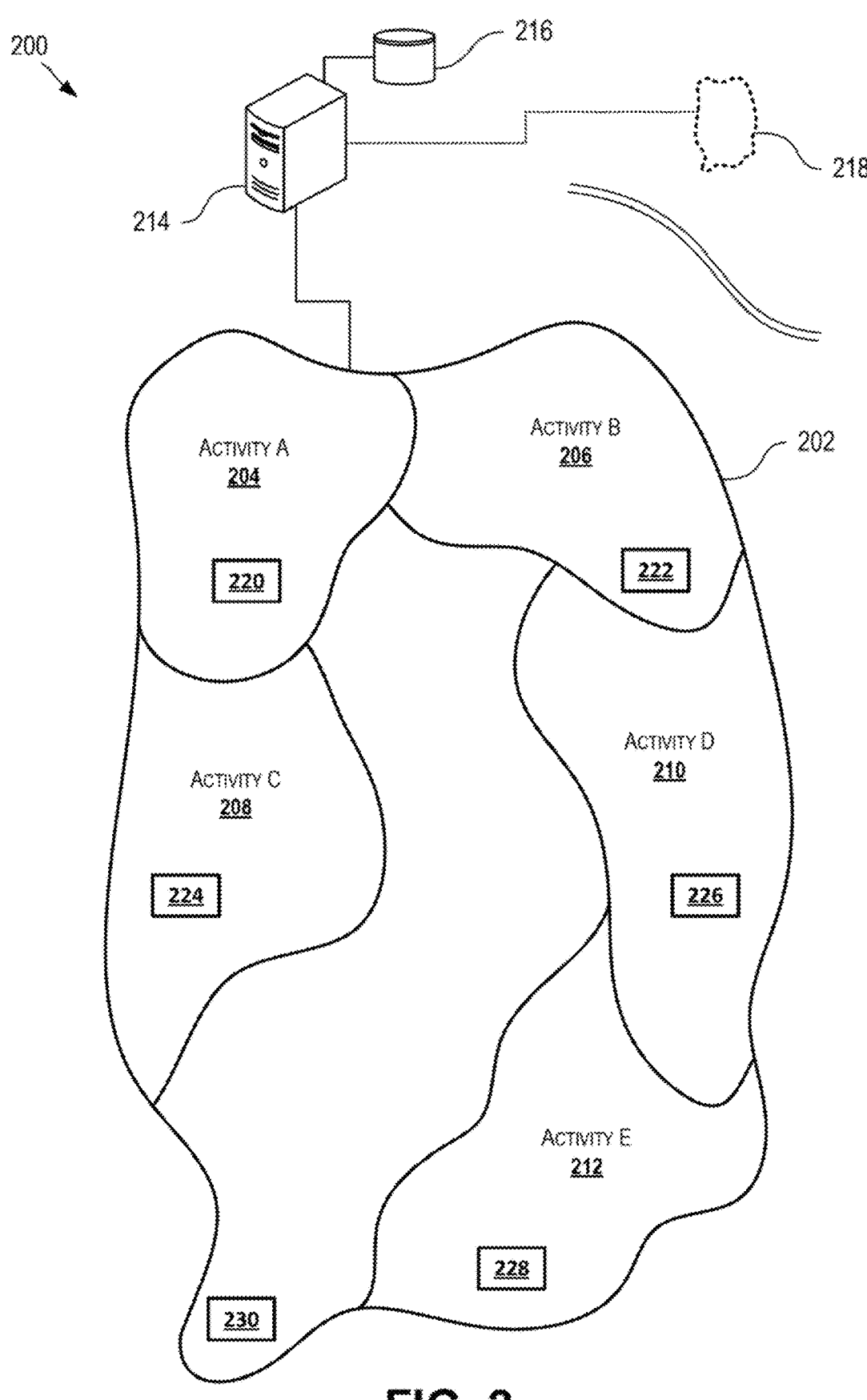
FIG. 2 is a schematic diagram depicting a venue automation environment associated with a venue according to certain aspects of the present disclosure.

Certain aspects and features of the present disclosure relate to a venue automation environment in which various forms of automation and user integration can be managed across one or more activities at one or more venues. Venue automation and integration can include automation at various stages of participant engagement including before, during, and after visiting one or more venues and participating in one or more activities at a venue. Venue automation and integration can include automated itinerary generation, activity reservation, participant identification, access control, payment managing, scoring, media capture (e.g., audio, photo, and video), and venue management.

A venue can include a collection of activities, such as in nearby proximity or confined within a single physical property, although that need not always be the case. As used herein, the term venue can refer to a sports-related venue, such as a location offering participation in one or more sports or sport-related activities. However, in some cases, a venue can also refer to locations offering participation in other activities, such as waterslides, rides, or other activities or experiences, such as in the case of water parks or amusement parks. In some cases, all activities of a venue may be confined within a single property, such as a single, contiguous piece of property (e.g., a single confined region of land or a single confined building or complex of connected buildings). In some cases, multiple activities can be located at separate properties, such as the case with multi-sport competitions where a first activity (e.g., a swimming-based activity) may take place in a first location (e.g., a swimming pool facility) and a second activity (e.g., a running-based activity) may take place in a second location distant from the first location (e.g., a track located in another part of town from the swimming pool facility). Thus, venues may be indicative of a single property, although that need not be the case.

Activities can be any suitable event in which an individual may participate. In some cases, an activity can be a sports-related activity, such as a sport or an activity somehow related to one or more sports, although that need not always be the case. As used herein, participation or engagement can include primary participation (e.g., the individual engaging in the activity himself or herself, such as an individual swimming) or secondary participation (e.g., the individual directing another in the engagement of the activity, such as a participant bringing his or her dog to a canine obstacle course race). In some cases, activities include passive events in which the participant primarily plays a passive role in experiencing the activity. Examples of such passive events can include participants viewing a video and participants riding on a ride (e.g., an amusement park ride). In some cases, activities include active events in which the participant primarily plays an active role in performing the activity. Examples of such active events can include rock climbing, racing, skiing, archery, and the like. In some cases, activities can include leisurely or downtime activities, such as rest time (e.g., for relaxing or sleeping), dining time (e.g., at a particular restaurant or other food venue), or other such activities. In some cases, an activity can be a skill-based or ability-based activity, in which a participant's level of skill, natural ability, or other characteristics dictate or substantially dictate the participant's success at performing the activity. Example skill-based or ability-based activities include climbing, biking, bowling, and skiing. In some cases, an activity can be a neutral activity, in which a participant's level of skill, natural ability, or other characteristics do not dictate or substantially dictate the participant's success at performing the activity. Example neutral activities include viewing a movie, playing a game of chance, and riding a roller coaster.

In some cases, activities are part of an action, extreme-sports amusement or theme park or other venue. Some non-limiting examples of activities can include one or more of whitewater rafting, kayaking, surfing, participating in a lazy river, chuting a river or other body of water (such as in a tube, kayak, paddle board or other vessel), downhill or cross country skiing, snowboarding, bobsledding, skateboarding, mountain biking, biking on bicycle motocross (BMX) trails, competing in combine drills from team sports leagues, participating in a zipline, rock climbing, bungee jumping, via ferrata climbing routes, luging, zorbing, participating in a mudder event (e.g., obstacle sources involving fire, water, mud, electricity, heights, etc.), among others.

The location housing the events can be preselected based on particular topography or terrain requirements of the various events housed within the location (e.g., mountains or hills suitable for skiing located adjacent or proximate relatively flat terrain for activities such as surfing, a lazy river, etc.).

In some cases, activities can be scored. For example, a race can have scores based on overall time to complete the race or time enduring a particular activity.

Activities can be single-person or multi-person. In a single-person activity, an individual can engage in the activity by themselves and can be scored accordingly. In a multi-person activity, an individual can engage in the activity with multiple individuals, each of whom can be scored individually and/or can be scored together as a team.

In some cases, an activity can be designed to optionally or always follow a preceding activity. For example, a rock climbing activity (e.g., first activity) could include four walls that terminate at a platform from which another activity (e.g., second activity) such as bungee jumping or ziplining could occur. In this example, if there is another way to access the platform to participate in the second activity, than the second activity can be considered to preferentially follow the first activity (e.g., it may be convenient to participate in the second activity immediately after the first activity, but participation in the first activity is not necessary for participation in the second activity). If, however, there is no other way to access the platform to participate in the second activity without first participating in the first activity, than the second activity can be considered an obligatory subsequent activity to the first activity. In such cases, the participant must participate in the first activity before participating in the second activity. In some cases, the participant may be required to participate in the second activity if desired to participate in the first activity, although that need not always be the case (e.g., in the case of rock climbing, the participant may be able to belay down to the start of the rock climbing activity once completing the activity, without necessarily participating in the second activity).

As described in further detail below, generation of an itinerary can include determining if a second activity preferentially follows a first activity and/or whether the second activity is an obligatory subsequent activity to the first activity, then using this determination to schedule the first and/or second activities. For example, if a participant cannot or desires not to participate in a particular activity, or if the particular activity cannot be scheduled for any other reason, the itinerary management system may specifically exclude certain other activities based on their obligatory relationship to that particular activity.

In some cases, information (e.g., photo, video, or data, such as scores) can be grouped among subsequent activities that are preferentially and/or obligatorily linked. For example, a participant live-streaming participation in a first activity can automatically switch to live-streaming participation in the second activity without further interaction. In another example, participation in a first activity and one or more obligatory subsequent activities can be grouped together for scoring purposes, presented as a set of individual scores for each activity and/or presented as a single score for the set of activities.

In some cases, the use of similar equipment or clothing can be used to group multiple activities as preferentially performed together (e.g., sequentially). For example, multiple water activities requiring a participant to wear a swimsuit may be scheduled together sequentially and/or separately from earlier or later activities requiring different clothing. In another example, multiple activities requiring particular equipment (e.g., footwear, skis, helmets, or the like) can be scheduled sequentially and/or separately from activities not requiring that equipment. In some cases, itinerary generation can be linked to an inventory management system to ensure the number of participants scheduled for a particular activity does not exceed the number of available equipment for rental or borrowing. For example, the itinerary management system can intentionally not schedule more than 20 participants at a time for activities requiring helmets if the current stock of available helmets is only 20, including or not including any reserve stock, such as for unscheduled participant arrivals. In some cases, the itinerary management system can use current data from an inventory management system (e.g., number of helmets currently available for borrowing), especially if generating an itinerary for that date or a nearby date. In some cases, however, the itinerary management system can use predicted data (e.g., a predicted number of helmets available for borrowing based on historical data and/or other information), especially if generating an itinerary for a future date or time.

Any combination of systems disclosed herein can be embodied on one or more computers (e.g., servers), whether co-located or not. In some cases, a particular system can embodied on multiple computers at different levels of hierarchy, from the multi-venue level (e.g., a computer associated with multiple venues), to the single-venue level (e.g., a computer associated with a single venue), to the multi-activity level (e.g., a computer associated with a set of activities), to the single-activity level (e.g., a computer associated with a single activity). Computers located within a venue, such as at each activity, can facilitate receiving and transmitting data associated with the venue and the activity, including historical data (e.g., usage data), participant scores, participant identification information, capture video or other media, or other data. In some cases, computers located within a venue, such as at each activity, can perform some or all of the actions necessary to various functions of the various systems disclosed herein. In some cases, certain functions of the various systems can be performed by a centralized server, which can include one or more computers at or distant from the venue.

Specific details are given herein to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting a venue automation environment 100 according to certain aspects of the present disclosure. The venue automation environment 100 can be associated with one or more venues, each of which can incorporate one or more activities (e.g., events). In some cases, the venue automation environment 100 is associated with multiple venues. In some cases, each venue incorporates multiple activities.

The venue automation environment 100 can include an automation management system 102, which itself can comprise numerous sub-systems capable of facilitating various automations across the venue(s) and any associated activities. Each system of the automation management system 102 can interact with one or more other systems to enable automations capable of improving efficiency of the venue, improving participant enjoyment of the venue, or otherwise providing a marketable benefit to venues incorporating the automation management system 102.

An itinerary management system 104 can handle automated itinerary generation. Automated itinerary generation can include generating customized itineraries (e.g., schedules) for participants at multi-activity venues. An itinerary management system 104 can be embodied in one or more computers. Each itinerary can include times, timeslots, or time windows for the participant to engage in one or more activities at a venue. Participants can prepare an entire itinerary of activities prior to or upon arriving at the venue, thus streamlining the participant's visit to the venue. Itineraries can be prepared by or for a participant. In some cases, itineraries can be automatically generated based on participant preferences and/or additional participant data, such as demographic data (e.g., age, residence location, or other demographics) or stored activity history. A participant identification system (e.g., an automated participant identification system) can be used to identify a participant at a venue and/or at an activity to ensure that participant is authorized to make use of or engage in that venue and/or activity. In some cases, itineraries can by dynamically generated based on historical and/or live data from one or more venues. In some cases, itineraries can be updated dynamically based on updated information from the venue, such as to minimize activity downtime within a venue (e.g., to take advantage of an activity that is not currently being used) or to account for planned or unplanned maintenance and/or closures (e.g., to automatically update a participant itinerary when an activity is broken or to automatically update the order of activities in a participant itinerary to route the participant away from a selected path in the venue). The itinerary management system 104 can interact with other systems disclosed herein to facilitate automation of itinerary generation, updating, and/or other itinerary management functions.

In some cases, generating an itinerary can include generating a schedule of multiple activities across a single venue or across multiple venues. An itinerary can be limited to a single day or can extend for more than a single day.

An itinerary can be generated based on participant criteria, such as user-provided preferences. Examples of criteria can include a preference for one activity over another, a preference to perform a particular activity sometime later in the day than another or immediately following another, a preference to engage in less strenuous activities in the afternoon, a preference to engage in a particular activity with another participant or team of participants, a preference to engage in a particular activity soon after or soon before another participant or team of participants engaging in that activity, a physical disability or limitation, or other such types of user-provided criteria.

In some cases, itinerary generation can also be based on other participant data, such as data collected by and stored by the venue. For example, participant data can include historical activity data indicative of the participant's past visit(s) to the venue in question or another venue. Examples of such historical activity data can include the number of times the participant has engaged in a particular activity, the trends of past engagement in the activity (e.g., performing certain activities in certain orders or performing certain activities in certain months of the year), past scoring information (e.g., some participants may enjoy engaging in activities which challenge the participant more, whereas some may enjoy engaging in activities in which the participant performs well), categories of past activities (e.g., water sports, high-speed activities, or other categories), ratings received by the participant after performing an activity, social media information associated with the participant and an activity (e.g., a participant sharing a video of themselves engaging in an activity and tagging the venue), or other historical information. In some cases, participant data can also include other stored information about the participant, such as previously received criteria and/or preferences, membership in a team or group, association with other participants, and/or current location (e.g., if location information is shared with a venue).

In some cases, participant data can include demographic data and/or demographically derived data (e.g., psychographic data), which can be used to inform itinerary generation. In some cases, participant data can be pre-populated with demographic data and/or demographically derived data, such as upon account generation or in early stages of the itinerary generation process, even without any available historical activity data of the participant's past visit(s) to any venue.

In some cases, participant data can include inference data. Inference data can include generated inferences and/or related data based on participant criteria, participant data, and/or participant input. For example, a participant may submit answers to questions that are unrelated or seemingly unrelated to the venue and/or activities of the venue, which answers can be stored as inference data and be used to generate inferences to help guide itinerary generation. In some cases, collected feedback can be used to improve future inference generation based on collected inference data. For example, if it is found that most participants who answer yes to "Do you like spicy foods?" all happen to enjoy a certain set of activities, the itinerary management system 104 can select that set of activities for a new user who also answers yes to the same question. In some cases, inference data can include results from personality tests or the like, such as results from a Myers & Briggs tests (e.g., provided by the participant).

In some cases, itineraries can be generated to emphasize or deemphasize the probability of spectators watching the participant. For example, if a participant dislikes spectators, the itinerary generated for that participant may include engaging in activities at times where many spectators are not expected to be at or near the activity (e.g., early or late in the day, or adjacent empty slots in the activity's schedule). In some cases, participants who like spectators may have itineraries generated that have the participant engaging in activities at times where spectators are expected to be at or near the activity. In some cases, score data can be used to identify high-performance participants. The itinerary of high-performance participants can be generated such that the participant engages in particular activities in which the participant performs well at times when spectators are expected to be at or near that activity. In some cases, generating an itinerary for a participant can include generating suggestions for being a spectator at activities which the participant is expected to enjoy. In such cases, the suggestions can be general (e.g., a notice indicating the participant may enjoy watching a particular activity) or for a particular time slot or window of time (e.g., an entry on the participant's itinerary for spectating a particular high-performance participant engaging in a particular activity at a particular time that day).

In some cases, itinerary generation can also be based on schedules associated with a venue and/or activities within a venue. For example, the schedules (e.g., current reservations from other participants) associated with several activities can be accessed so that an optimized schedule can be generated for the participant. An optimized schedule can prioritize location (e.g., performing nearby activities in succession), prioritize overall duration (e.g., selecting activities to minimize downtime between activities), or prioritize other aspects. In some cases, an activity's schedule can be accessed to determine potential downtime and try to schedule participants in that downtime to minimize the amount of downtime.

In some cases, itinerary generation can also be based on activity models. Activity models can be models designed to estimate various aspects of one or more activities in the venue. For example, an activity model can be used to predict how long a participant will engage in a particular activity before another participant can engage in the activity. In another example, an activity model can be used to predict how the length of a queue of participants that have not established itineraries (e.g., participants visiting the activity and waiting in line to participate without having a scheduled timeslot). In some cases, venue models can be used in addition to or instead of activity models. In an example, a venue model can be used to predict how long it may take a participant to travel from one activity to another, or when the busiest times of day or days of the year may occur.

Itineraries can include packages selectable by a participant. For example, a "land-lovers" package may include a selection of activities that do not involve water, whereas a "speed" package may include various racing and high-speed activities. Once a package is selected, an itinerary can be generated to include the activities in the package.

Once an itinerary is generated, it can be optionally presented for approval, rejection, or modification. In some cases, payment can be collected when an itinerary is approved. In some cases, a discount or other benefit can be obtained if a participant is willing to accept an itinerary without modification.

Generated and/or approved itineraries can be used to update schedules associated with the activities in one or more venues, ensuring that the activity schedules remain up-to-date in a dynamic and/or real-time fashion. Additionally, generated and/or approved itineraries can be used to update participant data (e.g., a list of commonly selected activities) dynamically and/or in real-time.

In some cases, itineraries can be updated on-the-fly based on various conditions of an activity, the venue, or the participant. For example, if an activity is running behind schedule or must undergo maintenance, a modification to the participant's itinerary can be proposed or forced. Such modifications can include altering times, dates, or activities. In some cases, if an activity is being underutilized, proposed modifications can be sent to participants to suggest they engage in that activity at certain times. In another example, if a participant is running behind on his or her schedule or misses an activity, modifications can be proposed or forced to alter the participant's itinerary. If a modification is proposed, the participant can accept, refuse, or further modify the proposed modification. If a modification is forced, the participant may be permitted to suggest a further modification that can be approved or refused by the itinerary generating system, or the participant's itinerary may be change without further action from the participant.

In some cases, an itinerary can include entries for activities across multiple venues, whether nearby or not. For example, several venues may be located within a sufficient distance to travel to each within a single day or a single multi-day trip. In such cases, an itinerary can be generated that includes activities from the multiple venues. In some cases, a participant can provide travel plans (e.g., between venues or between locations where venues may be located) that can be used to generate multi-venue itineraries. For example, a participant who is Florida on day 1 and will be in Las Vegas on day 2 may request an itinerary that includes one or more venues in Florida on day 1 and one or more venues in Las Vegas on day 2.

A reservation system 106 can handle automated activity reservation. The reservation system 106, can be embodied on one or more computers. The reservation system 106 can be associated with or part of the itinerary management system. Automated reservation can include automatically suggested reservation times for a participant to engage in a particular activity, such as to avoid the participant spending too long in a line. The automated reservation system 106 can integrate with the itinerary management system to access the participant's itinerary and suggest reservations times according to the participant's itinerary, such as to suggest reservations times adjacent times when the participant is engaging in a nearby activity, or such as to automatically remove or deemphasize available reservation times that would conflict with the participant's current itinerary (e.g., the time it would take to travel between activities is longer than the expected time gap between the activities). The reservation system 106 can interact with other systems disclosed herein to facilitate automation of activity reservations.

A participant identification system 108 can handle automated participant identification. A participant identification system 108 can be embodied in one or more computers. The participant identification system 108 can include a number of sensors positioned at a venue, including at activities of the venue, which can obtain participant identification information (e.g., a participant passkey) and use it to determine an identifier associated with the participant. The participant identification system 108 can use the participant identification information to identify when a participant is at a particular activity, when a participant is anticipated to soon be at a particular activity, and even the identity of the participant (e.g., an actual identity or an anonymized identity using an identifier associated with the participant). The participant identification system 108 can identify a participant by comparing the participant identification information with a participant registration database. In some cases, participant identification information can be identifiers (e.g., passkeys) obtained through electrical, wireless, visual, or other sensors. Ins some cases, participant identification information can be biometric information, such as a fingerprint or a recognized facial pattern. Participant identification information can be obtained through any number of sensing devices, such as cameras, radio frequency identification (RFID) scanners, fingerprint scanners, Bluetooth trackers, near field connect (NFC) equipment, or any other suitable sensor equipment. In some cases, a participant identification system 108 can interact with a venue-provided device (e.g., a bracelet or badge) to identify the participant. In some cases, a participant identification system 108 can interact with a participant-provided device (e.g., a participant's smartphone) to identify the participant. In some cases, the participant identification can interact with the participant (e.g., via facial recognition, voice recognition, or a participant-input identifier) to identify the participant. In some cases, the participant identification system 108 can automatically identify a participant without the participant actively providing identification. In some cases, the participant identification system 108 can automatically identify a participant without the participant interaction other than the participant's presence at an activity (e.g., within a particular zone of an activity, such as a queue). In some cases, the participant identification system 108 can provide automatic identification of participants, enabling other systems to perform automated tasks specific to the participant. In some cases, the participant management system can determine that a participant is part of a group or team. In some cases, the participant identification system 108 can interact with other systems disclosed herein to facilitate identification of a participant.

In some cases, an itinerary can be used to update participant identifier information. Participant identifier information can be known as passkey information, with the participant identifier being used as a passkey to identify and/or authenticate a participant. A passkey can be any type of physical or non-physical (e.g., digital) information usable by participants to identify themselves to an activity or a venue, as described herein. Examples of suitable passkeys can include names, identification numbers, barcodes, radio frequency identification tags, digital signatures, digital certificates, or other such information. Computers at the venue, such as computers at an activity, can read the passkey and admit the participant into the activity. For example, a passkey that incorporates an RFID tag can include thereon an identifier that is usable to identify the participant to an RFID reader. In some cases, a participant's biometric data can be used as an identifier (e.g., a fingerprint, retinal, or facial scan). In some cases, if a passkey associated with an itinerary entry is received at the time of the itinerary entry, entry can be permitted. In some cases, if a passkey associated with an itinerary entry is received at the time of the itinerary entry, entry can be permitted through an expedited entrance. Receiving a passkey at the time of an itinerary entry can include receiving the passkey at an allotted time indicated by the itinerary or within a window of time before, after, or around the allotted time. A passkey associated with an itinerary entry can be a passkey associated with a participant who is scheduled to participate in the activity at the allotted time.

In some cases, a participant can have a static passkey usable for multiple visits and/or multiple itineraries. In such cases, updating passkey information can include updating information at a venue or an activity to ensure entry can be provided when the passkey is received. In some cases, however, new passkeys can be generated for each itinerary and/or each activity of the itinerary. In such cases, updating passkey information can include providing the passkey to the participant or associating the passkey with an account of the participant.

An access control system 110 can handle automated access control. An access control system 110 can be embodied in one or more computers. Automated access control can interact with the participant identification system to determine the identity of the participant (e.g., a participant identifier), who may then be granted or denied access to the desired resource. In some cases, automated access control grants or denies access without any user interaction other than the user's presence. Access control can grant or deny access to a venue, an activity at a venue, or any other resource associated with the venue. In some cases, automated access control can use the identity of the participant to automatically determine if the participant has a reservation (e.g., via the reservation system), automatically determine if the participant has paid for access to the desired activity, and if not, initiate payment (e.g., via the payment management system 112), automatically check and/or update the participant's itinerary (e.g., via the itinerary management system 104), and/or automatically provide access to media data associated with the venue, activity, and/or participant. In some cases, granting access to an activity can include automatically customizing the activity to the user, such as automatically adjusting difficulty levels, power levels, or resistance levels of equipment; automatically providing participant information (e.g., a name, handle, photo, and/or avatar) to the activity (e.g., to displays at or incorporated into the activity), automatically selecting suitable equipment for the participant, or performing any other suitable customizations. In some cases, the access control system 110 can interact with other systems disclosed herein to facilitate granting or denying access (e.g., to a venue, an activity, or any other resource associated with the venue).

Certain aspects and features of the present disclosure relate to automated payment managing. Automated payment managing can be performed by a payment management system 112, which can be embodied on one or more computers. Payment management system 112 can store payment data associated with a participant. Payment data can include historical purchases, offers, coupons, stored methods of payment, or other payment-related data. The payment management system 112 can interact with other systems to automate payment while the participant is at the venue. For example, a participant can simply walk up to an activity and begin engaging in the activity, at which point the participant identification system can identify the participant and provide the participant's identification to the payment management system 112, which can process the necessary payment, all without interrupting the participant's engagement with the activity. In some cases, processing a payment can include deducting credits associated with a participant's historical purchase(s). In some cases, processing a payment can include initiating a new payment using the participant's selected method of payment (e.g., a credit card). In some cases, the payment management system 112 can communicate with equipment at the activity to provide feedback (e.g., audio, visual, or tactile) to indicate information associated with processing of a payment, such as an indication of payment success, an indication of payment failure, an indication of the number of credits remaining, an indication that the number of credits remaining is below a threshold, an indication of the amount of the payment, or an indication of an offer available to the participant (e.g., a discounted bundle offer available because of the participant's engagement in the given activity). In some cases, the payment management system 112 can interact with other systems disclosed herein to facilitate management of participant payments.

A scoring system 114 can handle automated scoring. A scoring system 114 can be embodied on one or more computers. Automated scoring can include automatically tracking the score for one or more participants and associating the tracked score with the participant, such as using a participant identifier. In some cases, the scoring system 114 can interact with the participant identification system to automatically detect the participant engaging in a particular activity. The scoring for that activity can be tracked automatically, manually, or partially automatically. For example, sensors, timers, or other equipment can be set up in association with the activity to automatically triggers scoring events (e.g., a basketball falling into a hoop to score a basket, a button pressed at the top of a climbing wall to trigger a timer to stop, or a machine vision system tracking a ski jump to calculate the height of the jump). In some cases, activity scoring can be entirely manual and be based on human input (e.g., via a referee or activity operator). In some cases, activity scoring can be partially automatic, which can include human input being used to confirm or provide additional information to supplement automatically obtained scores or metrics. In some cases, the scoring system 114 can interact with other systems disclosed herein to facilitate managing scores associated with participants.

In some cases, upon detecting and/or identifying a participant or team of participants using the participant identification system, the participant identification system can communicate identifying information to the scoring system 114, which can facilitate automatically scoring the participant's performance (e.g., time to complete, endurance time, distance travelled, or some other metric) in the activity. In some cases, the scoring system 114 can include scoring sensors associated with the activity. In some cases, the scoring system 114 is entirely automatic, recording the participant's performance and storing it. In some cases, operator control may be necessary, however the automatic score recorder can automatically pair operator input with identifying information about the participant, thus facilitating the operator's input being paired with the participant. Operator input can be a score for that particular activity or can be other input used to generate a score for the activity.

The scoring system 114 can automatically score and/or rank participants engaging in one or more activities across one or more venues.

In some cases, combining various systems and/or automations disclosed herein (e.g., combining automatically identifying a participant, performing access control using participant identifier, and automatically scoring the activity and associating the score with the participant identifier) can enable activities and/or venues to operate quickly with reduced or minimized downtime between participants and reduced or minimized operator error. Additionally, automatic scoring can minimize or eliminate operator interactions necessary to record scores for a particular event. The automated event access and scoring system 114 can allow a participant's performance across one or more of a plurality of activities to be recorded, displayed, ranked, aggregated, compared against other users or that participant's past performances, analyzed, and/or stored. For example, a participant's performance in one or more of the activities can be stored and compared against the same or a different participant's subsequent or previous performance in the one or more activities. The scoring information can be displayed on any suitable display medium, such as display monitors located throughout or remote to the venue, live streams (e.g., accessible via the Internet), or through a smart phone.

A media management system 116 can handle automated media capture (e.g., audio, photo, and video). Automated media capture can include automatically and dynamically generating customized photo, video, and/or other media data based on a participant's engagement in one or more activities at one or more venues. A media management system 116 can be embodied in one or more computers. The media management system 116 can interact with a media capture subsystem associated with the venue. The media capture subsystem can incorporate any number of computers, cameras, sensors, data logging equipment, or other equipment throughout the venue, including at activities of the venue. For example, cameras and data logging equipment can be set up throughout the venue, including at activities of the venue, to capture photo, video, and/or other media data associated with a participant. The media management system 116 can identify photo, video, and/or other media data associated with a participant and compile all of the media data together. In some cases, a compilation video, photostream, and/or other output media data can be automatically and dynamically generated for individual activities or multiple activities, which can be made available to the participant. In some cases, the participant can live stream photo, video, and/or other media content while participating in the activity. The system can automatically make determinations and inferences to change camera angles or other data sources based on a participant's progress through the activity. The media management system 116 can interact with other systems disclosed herein to facilitate automation of media capture.

Cameras and other data logging equipment (e.g., scoring sensors) can be positioned throughout the venue, including on a participant or spectator. The cameras can record photo and/or video data, while the other data logging equipment can record other types of data, such as scores or other metrics. In some cases, additional audio sensors (e.g., microphones) can be used to provide audio data for or in addition to the video data. In an example a rock climbing wall can include several cameras, such as a helmet-mounted camera, an overhead camera, a wide angle camera facing the rock climbing wall, and one or more cameras built into the wall and facing outwards, as well as data logging equipment (e.g., a timer for timing the participant's ascent and a button at the top of the wall actuatable by the participant to stop the timer). A computer or other video processing equipment can store the feeds from each device (e.g., cameras and timer). In some cases, only a compilation of data is stored, rather than feeds from each device.

In some cases, device can be user-worn and/or user-provided. For example a heart rate sensor can be used to track a participant's heart rate during a particular activity. Such heart rate sensor can be provided by the venue and can directly feed data back to a computer at or associated with the venue. In some cases, however, the heart rate sensor can be a user-provided device, such as a participant's smartwatch. In such cases, an application or other integration can allow the participant to share the heartrate data with a computer at or associated with the venue.

Metadata can be generated that associates the received participant identifier to the photo, video, and/or audio data. In some cases, multiple sensors positioned within the activity can track a participant, such as through radio frequency identification triangulation or other techniques. In some cases, multiple participants may be engaging in a single activity at a single time. In such cases, tracking or other techniques can be used to associate particular device feeds to the various participants. In some cases, moving cameras can be used to follow a participant through analysis of tracking data or motion capture data.

In some cases, a computer can stream photo, video, and/or other data live over a network, such as the Internet. In some cases, such a live stream can be integrated with social media platforms to allow the participant an opportunity to live stream his or her engagement with an activity to friends and family. A live stream can include live data from all data sources or can include an automated compilation stream. An automated compilation stream can include automatic fading or switching between cameras to keep the participant or participant's action in view while the participant engages in the activity. For example, in a rock climbing wall, motion capture, pressure sensors, light sensors, or other techniques can be used to automatically determine which cameras to use as the participant progresses along the route. In some cases, streams, such as a video stream or a photo stream, can include other data, such as timer data, heartrate data, scoring information, or other metrics and other data associated with the participant's engagement in the activity.

In some cases, the photo, video, and/or other data can be stored for delivery to or access by the participant after completing the activity and/or after leaving the venue. The data can be stored for a predetermined period of time or indefinitely. Data can be stored as full feeds from each device and/or compilation data (e.g., a compilation video or collection of photographs). The system can automatically generate compilation data by processing the various feeds from each device. For example, a compilation video can be generated simply by analyzing the video feeds from each camera for motion and other qualities (e.g., exposure and/or color). In some cases, additional or alternate data synchronized with the video feeds, such as data from pressure sensors, proximity sensors, light sensors, acoustic sensors, and the like can be used to identify which camera to use for a particular segment of the compilation video. Compilation videos can be made for each activity, collections of activities (e.g., similar activities), or an entire visit to a venue or multiple venues.

In some cases, a participant can interact with the system to select, approve, reject, and/or modify various clips to create his or her own compilation video. In some cases, the participant can access or receive the various data, including video, photo, and/or other data. Data can be delivered on hardware (e.g., on a USB stick or DVD) or over a network (e.g., via email or website access through the Internet).

In some cases, multiple participants can be associated with a team or group (e.g., a family). In such cases, the system can provide access to feeds and/or compilation videos to the various members of the team or group. For example, parents might be able to access the data for themselves and their children. In some cases, the system can generate compilation videos (e.g., per activity, per multiple activities, or per venue or multiple venues) that include segments from multiple participants associated with the team or group. For example, a soccer team playing a soccer activity can receive a compilation video containing segments for some or all of the participants on the team.

In some cases, the system can automatically generate comparison data, such as comparison videos, photos, or other data (e.g., heartrate charts). The comparison can be based on current participant data and compared data. The compared data can be past data of the participant (e.g., comparing videos of a previous visit to the venue or an earlier engagement in an activity that day) or can be data from another participant (e.g., comparing videos of multiple people on a team or between a participant and the highestscoring participant that week). In another example, a participant in a golf driving activity can receive an automatic compilation video that shows side-by-side comparisons of slow-motion video of his or her current drive and a previous drive from an earlier visit to the activity (e.g., last week, last month, or last year).

A venue management system 118 can handle automated venue management. A venue management system 118 can be embodied in one or more computers. The venue management system 118 can facilitate interactions between multiple systems, such as a participant identification system and an access system. Each venue can have its own venue management system 118, although in some cases a single venue management system 118 can be associated with more than one venue. The venue management system 118 can facilitate coordinating the various computers, sensors, cameras, and other equipment associated with multiple activities within a venue. In some cases, when various systems disclosed herein are embodied locally at a venue, the venue management system 118 may facilitate coordinating the flow of data between these systems locally. However, when one or more of the systems disclosed herein are embodied remotely from the venue, the venue management system 118 can facilitate interactions and the flow of data between the equipment at the venue and any systems remote from the venue. For example, an itinerary generation system may be embodied on a remote server, which can be especially suitable for enabling efficient access through a web browser while a participant is planning a future trip to a venue. In such an example, the venue management system 118 may store a copy of the participant's itinerary when appropriate (e.g., on days or during times when the participant is scheduled to be at the venue) so any requests to access the participant's itinerary can be quickly handled locally. In some cases, the venue management system 118 can interact with other systems disclosed herein to facilitate managing a particular venue.

FIG. 2 is a schematic diagram depicting a venue automation environment 200 associated with a venue 202 according to certain aspects of the present disclosure. A venue 202 is depicted schematically in an overhead view, including five activities: Activity A 204, Activity B 206, Activity C 208, Activity D 210, and Activity E 212. Any number of activities can be used, including one or more than one. Computer A 220 is associated with Activity A 204, Computer B 222 is associated with Activity B 206, Computer C 224 is associated with Activity C 208, Computer D 226 is associated with Activity D 210, and Computer E 228 is associated with Activity E 212. In some cases, a computer associated with an activity can be associated with more than one activity. A venue computer 230 can be associated with the venue 202 as a whole. The computers 220, 222, 224, 226, 228, 230 can receive and transmit information about participants, itineraries, scoring data, media (e.g., photos or video), schedules, information about activities 204, 206, 208, 210, 212, information about the venue 202, participant identification data, biometric data, or other data amongst one another and/or to a server 214. Each of the computers 220, 222, 224, 226, 228, 230 can be coupled to cameras, scoring equipment, sensors, and other devices for obtaining various types of data (e.g., biometric data, scoring data, photos, video, and others). The automation management system 102 of FIG. 1 can be embodied, at least in part, across one or more of computers 220, 222, 224, 226, 228, 230 and/or server 214.

Server 214 can be a computer located at the venue 202 or distant from the venue 202. In some cases, server 214 can be implemented in any of the computers 220, 222, 224, 226,

228, 230, or can be its own computer or array of computers. Server 214 can include a data storage 216 for storing information necessary to perform any of the automations disclosed herein, such as information related to participants, itineraries, participant identification data, schedules, activities 204, 206, 208, 210, 212, the venue 202, participant identification data, photos, video data, scoring data, biometric data, or other data. In some optional cases, server 214 can be further associated with an additional venue 218, which can include its own computers similar to venue 202. Any number of additional venues 218 can be used. An additional venue 218 can be located proximate to or distant from the venue 202.

Venue 200 can include any combination of an itinerary management system, a reservation system, a participant identification system, an access control system, a payment management system, a scoring system, a media management system, and a venue management system, such as the itinerary management system 104, reservation system 106, participant identification system 108, access control system 110, payment management system 112, scoring system 114, media management system 116, and venue management system 118 of FIG. 1, respectively.

FIG. 3 is a schematic diagram depicting an automated event access and scoring system 300 according to certain aspects of the present disclosure. The event access and scoring system 300 incorporates a aspects of a participant identification system operating through the use of user tags (e.g., user 1 tag 330, user 2 tag 338, and user 3 340). Any number of user tags can be used. In some cases, the tag is housed within a wristband, ticket, smartphone, housing, or the like. Each user tag is assigned to a participant. Thus, any interactions made using a particular user tag can be associated with that respective participant. The user tags can be read by tag readers (e.g., tag reader A 332, tag reader B 342, and tag reader Z 352, associated with activity A 336, activity B 346, and activity Z 356, respectively). Any number of tag readers can be used. In some cases, each activity in a venue can have its own associated tag reader, although that need not always be the case. In some cases, an activity can have no tag readers. In some cases, an activity can have multiple tag readers. Whereas the tags and tag readers depicted in FIG. 3 embody certain techniques for participant identification, the tags and tag readers can be replaced with other participant identification equipment, such as cameras, bluetooth trackers, biometric scanners, alphanumeric input panels, barcode scanners, or any other suitable participant identification equipment.

As depicted in FIG. 3, user 1 tag 330 is held in proximity to tag reader A 332, which is associated with activity A 336. Tag reader A 332 can interact with an access system 360 to determine if the participant associated with user 1 tag 330 is permitted to access activity A 336. In some cases, an optional payment system 362 can be accessed to deduct credits, initiate payments, or otherwise authorize access to the activity in associated with a past, current, or future payment. In some cases, a reservation system 364 can be accessed to determine if activity A 336 is available for the participant associated with user 1 tag 330, or if the activity is reserved for another participant at that time. In some cases, the reservation system 364 can indicate that the participant associated with user 1 tag 330 is scheduled for that activity at that time, in which case the reservation system 364 can facilitate granting access. In some cases, a reservation system 364 can be coupled to the tag reader(s) 332, 342, 362 to allow a participant to reserve a timeslot for participation in the associated activity, thereby allowing the participant to participate in other activities rather than wait in a line for participating in that particular activity.

After access is granted to activity A 336, the user can begin engaging in the activity. Automatic score recorder A 334, which is associated with activity A 336, can automatically begin tracking scores or other metrics associated with the participant's engagement with the activity. The scores or other metrics can be provided to a scoring system 368, which can store the scores and associated participant identifiers (e.g., "User 1," "User 2," "User 3") in a table 370 or other suitable database. Thus, the participant's scores can be automatically associated with the participant. As disclosed herein, an automatic score recorder can include any suitable sensors, timers, or other equipment necessary to track scores or other metrics associated with the given activity.

In some cases, granting access to activity A 336 can cause an optional media management system 366 to automatically begin recording media (e.g., photos or video) associated with the participant's engagement in activity A 336. As disclosed herein, the media management system 336 can automatically capture photos, video, or other media data associated with the participant. In some cases, the automatically captured media data can be correlated with or otherwise associated with scores or other metrics from scoring system 368. For example, the appropriate scoring information can be automatically incorporated into the media data, such as through an overlay on a photo or video. In such an example, the video of a participant engaging in the activity can automatically incorporate a realtime score panel or scoreboard overlaid on the video.

After or before participating in activity A 336, scanning of user 1 tag 330 by tag reader B 342 or tag reader Z 352 can control access to activity B 346 or activity Z 356, respectively, and initiate automated scoring via automatic score recorder B 344 or automatic score recorder Z 354, respectively.

Figure 4:
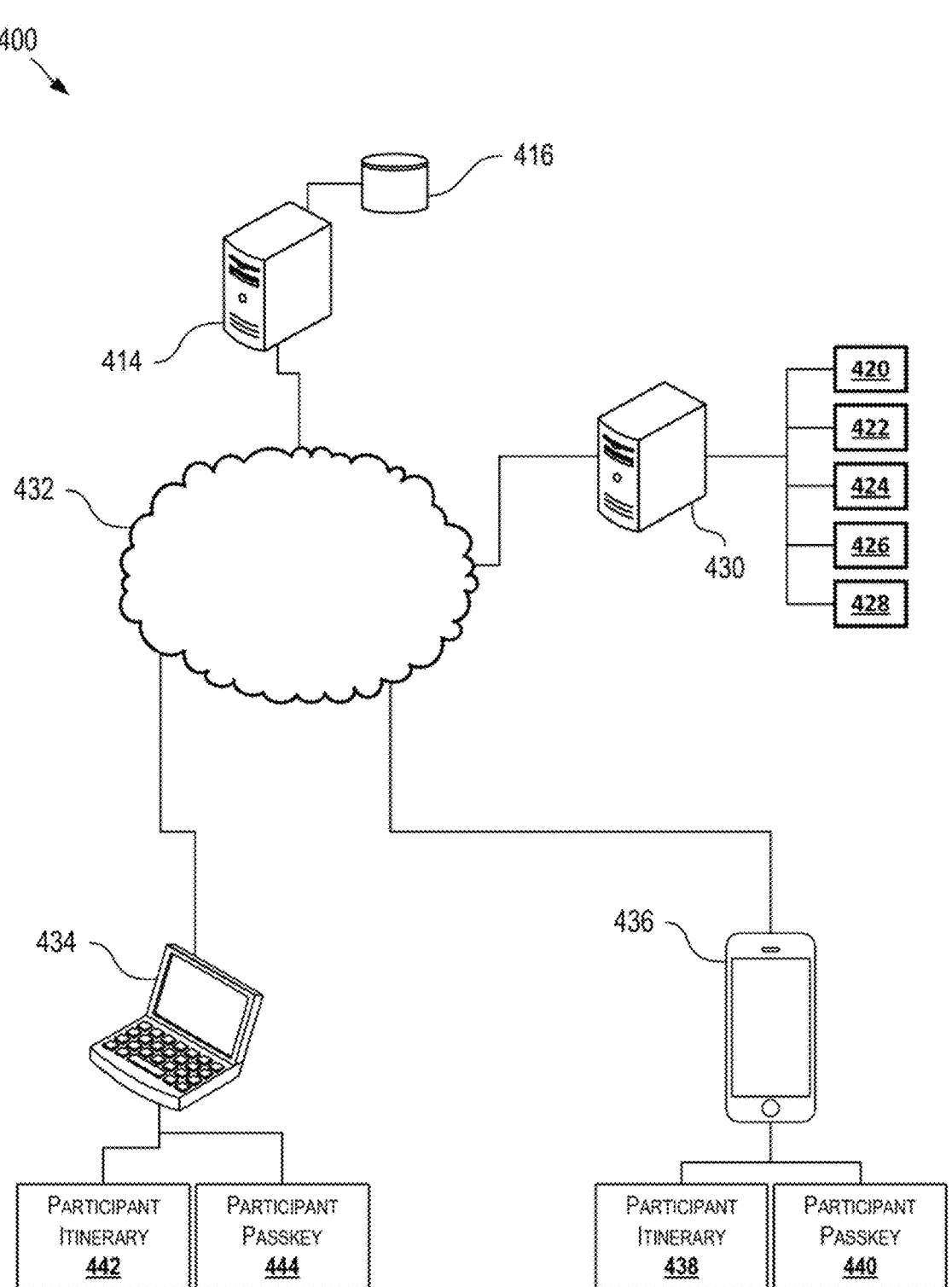
FIG. 4 is a schematic diagram depicting an itinerary management system according to certain aspects of the present disclosure.

FIG. 4 is a schematic diagram depicting an itinerary management system 200 according to certain aspects of the present disclosure. Server 214 can be an example of server 214 of FIG. 2. Server 414 can include a data storage 416 and can be accessible through a network 432, such as a wide area network, such as the Internet or a cloud. A venue computer 430 can be coupled to the network 432 to communicate with the server 414 to share various information as described herein. In some cases, a venue computer 430 can be coupled to computers 420, 422, 424, 426, 428, which may each be associated with an activity in the venue (e.g., similar to computers 220, 222, 224, 226, 228 of FIG. 2). In some cases, computers 420, 422, 424, 426, 428 can relay information to the server 414 through the venue computer 430, although that need not be the case.

Through the network 432, server 414 can be accessible to generate an itinerary. A participant device 436 is depicted in FIG. 4 as a smartphone, although any other suitable device can be used, such as a personal computer, a tablet, a kiosk (e.g., at a venue or at a partner site), or the like. The participant can interact with the participant device 436 to have the server 414 generate a participant itinerary 438 which can be optionally stored on the participant device 436. Additionally, the participant device 436 can store a participant passkey 440 (e.g., participant identifier or participant identification information) associated with the participant, with the participant itinerary 438, and/or with individual entries of the participant itinerary 438. A participant may interact with the participant device 436 prior to visiting the venue (e.g., to generate an itinerary for a planned visit), during a visit to the venue (e.g., to update or modify an itinerary), or after leaving the venue (e.g., to review the past itinerary or information associated with participation in the activities, such as scores).

In some cases, an agent device 434 can be used to access server 414 through a network 432. An agent device 434 can be any suitable device, such as a personal computer, a smartphone, a tablet, a kiosk, or the like. A participant can interact with an agent in-person or remotely (e.g., online or over the phone) to have the agent generate a participant itinerary 442 for the participant. The agent can also generate a participant passkey 444 for physical and/or digital delivery to the participant.

FIG. 5 is a flowchart depicting a process 500 for generating an itinerary according to certain aspects of the present disclosure. At block 502, participant criteria is received. Participant criteria can be received by accessing a database or by receiving input from a participant. Participant criteria can include preferences, package selections, disabilities or limitations, or other criteria. At block 504, participant data is accessed. Participant data can include historical data or other data accessible to the itinerary management system (e.g., stored in a database of the itinerary management system or accessible via third party websites) that is or can be associated with the participant.

At block 506, activity schedules for the selected venue or venues can be accessed. Activity schedules can include information about when an activity is open and/or available, as well as information about when an activity is occupied by other participants.

At block 508, an activity model for the venue can be accessed. The activity model can be used to generate predictions and inferences for individual activities, groups of activities, and/or the venue as a whole.

At block 510, a proposed itinerary can be generated for the participant. Generating the proposed itinerary can include using participant criteria. In some cases, generating the proposed itinerary can include using one or more of participant data, activity schedule information, activity predictions, or venue predictions. In some cases, generating the proposed itinerary can include using other information as disclosed herein. The itinerary can be generated to optimize various factors, such as participant criteria, participant preferences, activity usage, activity downtime, venue usage, participant routing within a venue (e.g., optimizing foot traffic), or other factors.

At block 512, the proposed itinerary can be transmitted to a participant. Transmitting the proposed itinerary can be performed physically (e.g., via paper) or digitally (e.g., via email or other internet traffic). At optional block 514, modifications to the proposed itinerary can be received. In an example, a participant can wish to change the itinerary generated at block 510, such as to add or cancel activities or alter activity times.

At block 516, an activity payment transaction can be initiated and/or the itinerary can be finalized. In cases where payment is not necessary or payment is to be accepted in other ways (e.g., at a venue entrance or using a pre-paid ticket), block 516 can include finalizing the itinerary, such as receiving a confirmation from a participant. In some cases, however, a payment transaction can be initiated at block 516. The payment transaction can include an overall cost for access to the venue, a cost per activity, costs associated with renting equipment for participating in any activities, and/or other costs. In some cases, the payment transaction must be completed (e.g., payment processed) prior to the itinerary being finalized. In some cases, a payment transaction can be initiated, but not completed, prior to the itinerary being finalized (e.g., if payment is to be collected at a later time). In some cases, initiating a payment transaction can include making a partial payment.

Once the itinerary is finalized, whether after payment or not, various final actions can occur, such as those at blocks 518, 520, and 522. At block 518, activity schedule(s) for the venue(s) can be updated based on the entries in the finalized itinerary. Updating an activity schedule can include reserving a particular timeslot for that activity such that the timeslot is associated with the participant. At block 520, passkey information can be updated. Updating passkey information can include updating information stored by the itinerary management system, venue, or activity, or updating passkey information stored by the participant. In some cases, updating passkey information includes updating permissions associated with an existing passkey. In some cases, updating passkey information includes generating one or more new passkeys. At block 522, participant data can be updated. For example, participant data can be updated with the activities selected for the itinerary, activities removed from the itinerary, or any other interactions with or information about the participant available from the other portions of process 500.

Figure 6:
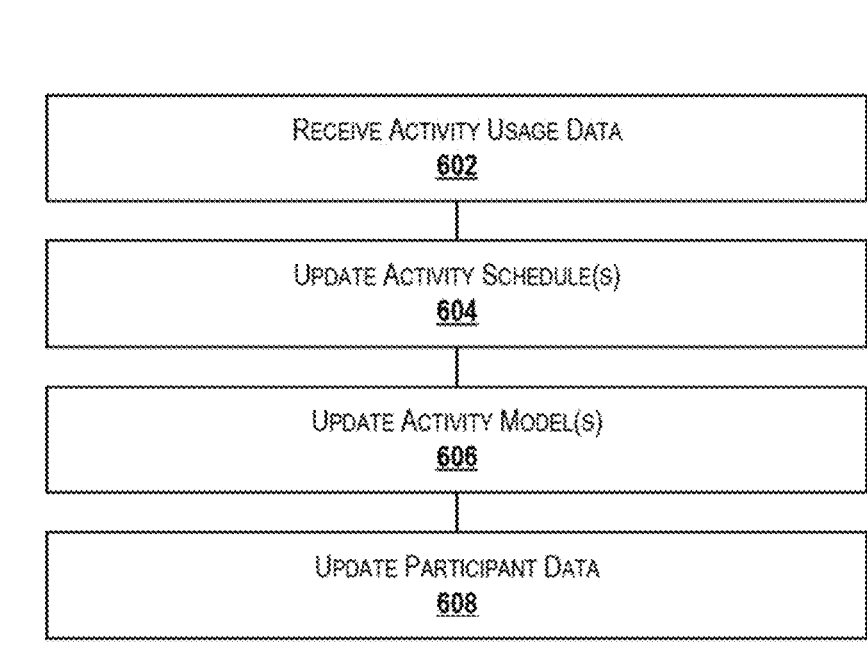
FIG. 6 is a flowchart depicting a process for updating various information from activity usage data according to certain aspects of the present disclosure.

FIG. 6 is a flowchart depicting a process 600 for updating various information from activity usage data according to certain aspects of the present disclosure. At block 602, activity usage data can be received. Receiving activity usage data can include receiving any information associated with an activity and/or a participant's engagement with an activity, such as the number of individuals in a queue, the score a participant achieved in the activity, a metric associated with wear and/or maintenance of equipment of the activity, or any other such information associated with the use of an activity.

After receiving the activity usage data at block 602, activity schedule(s) can be optionally updated at block 604. For example, information received at block 602 that is indicative of a future need for maintenance can result in a block of time being reserved for maintenance on the activity's schedule.

After receiving the activity usage data at block 602, activity model(s) can be optionally updated at block 606. For example, if data received at block 602 regularly indicate that participants spend more time than expected engaging in the activity, any models associated with that activity can be updated to give more accurate predictions.

After receiving the activity usage data at block 602, participant data can be optionally updated at block 608. For example, if data received at block 602 indicates that a participant scored highly in a particular activity, participant data associated with that participant can be updated to reflect the scores achieved, to reflect high-performance in that activity, and/or to reflect an inference that the participant enjoys that activity.

In some cases, other information can be updated after receiving activity usage data at block 602.

Figure 7:
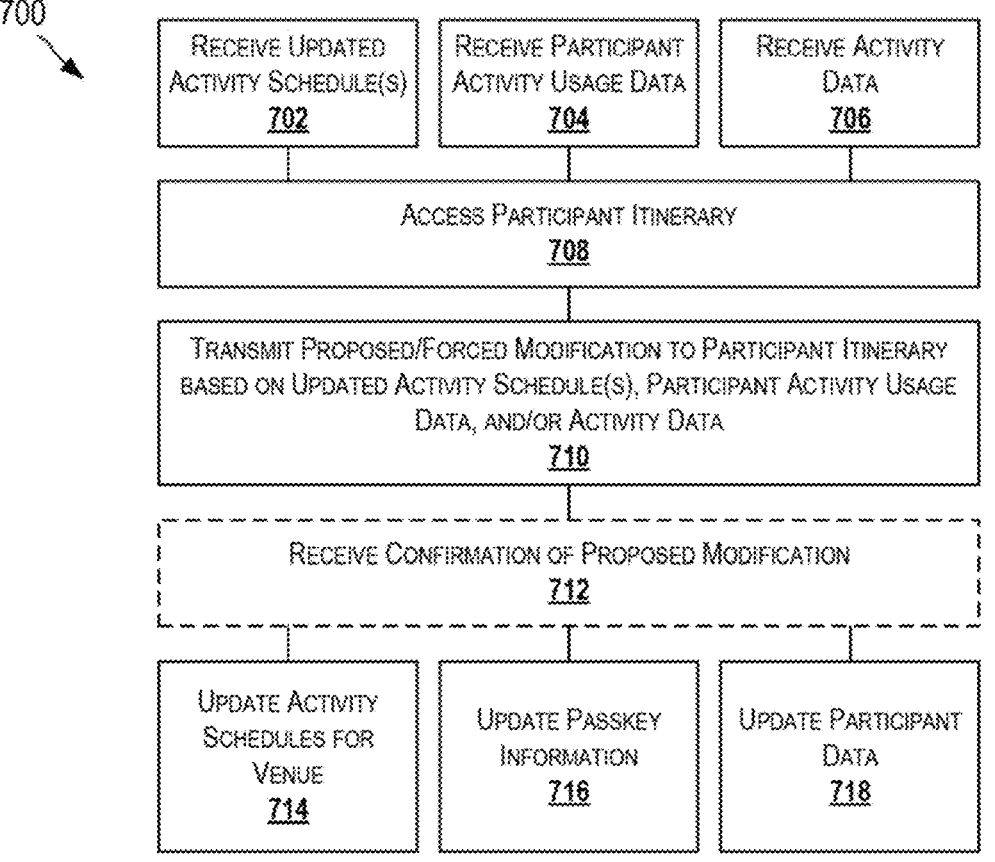
FIG. 7 is a flowchart depicting a process for dynamically updating an itinerary according to certain aspects of the present disclosure.

FIG. 7 is a flowchart depicting a process 700 for dynamically updating an itinerary according to certain aspects of the present disclosure. Dynamic updating of a participant's itinerary can be initiated automatically upon receiving new or updated information (e.g., as described with reference to blocks 702, 704, 706), can be performed regularly according to a schedule, or can be initiated on demand by a request (e.g., by the participant or a venue representative). Dynamic updating can be performed to provide suggestions to improve a participant's experience, provide necessary updates (e.g., due to delays or maintenance), or otherwise.

One or more of blocks 702, 704, 706 can initiate dynamic updating of a participant's itinerary. At block 702, updated activity schedule(s) can be received. An updated activity schedule can indicate that an activity is no longer available for a particular timeslot or that an activity is now free during a timeslot (e.g., a previously desired timeslot). At block 704, participant activity usage data can be received. In an example, participant activity usage data can include a starting time at which the participant begins a first activity. In this example, the starting time and the expected duration of the first activity can lead to an inference that the participant may not be able to maintain his or her itinerary, thus instigating an update. Other examples can be used. At block 706, any activity data can be received, such as participant scores, information indicative of a need for future maintenance, or any other such information.

At block 708, the participant's itinerary can be accessed. The itinerary can be used to determine if any modifications may be desirable and/or necessary. At block 710, a proposed and/or forced modification to the participant's itinerary can be generated and/or transmitted. The modification can be based on one or more updated activity schedules received at block 702, participant activity usage data received at block 704, and/or activity data received at block 706, although other information can be used as well. For example, location information can be accessed to suggest an itinerary based on the participant's current location.

At optional block 712, conformation of the proposed modification can be received.

Once the itinerary modification is sent and/or confirmed, various final actions can occur, such as those at blocks 714, 716, and 718. At block 714, activity schedule(s) for the venue(s) can be updated based on the entries in the modified itinerary. Updating an activity schedule can include reserving a particular timeslot for that activity such that the timeslot is associated with the participant. At block 716, passkey information can be updated. Updating passkey information can include updating information stored by the itinerary management system, venue, or activity, or updating passkey information stored by the participant. In some cases, updating passkey information includes updating permissions associated with an existing passkey. In some cases, updating passkey information includes generating one or more new passkeys. At block 718, participant data can be updated. For example, participant data can be updated with confirmation or rejection of the proposed modification or any other interactions with or information about the participant available from the other portions of process 700.

Figure 8:
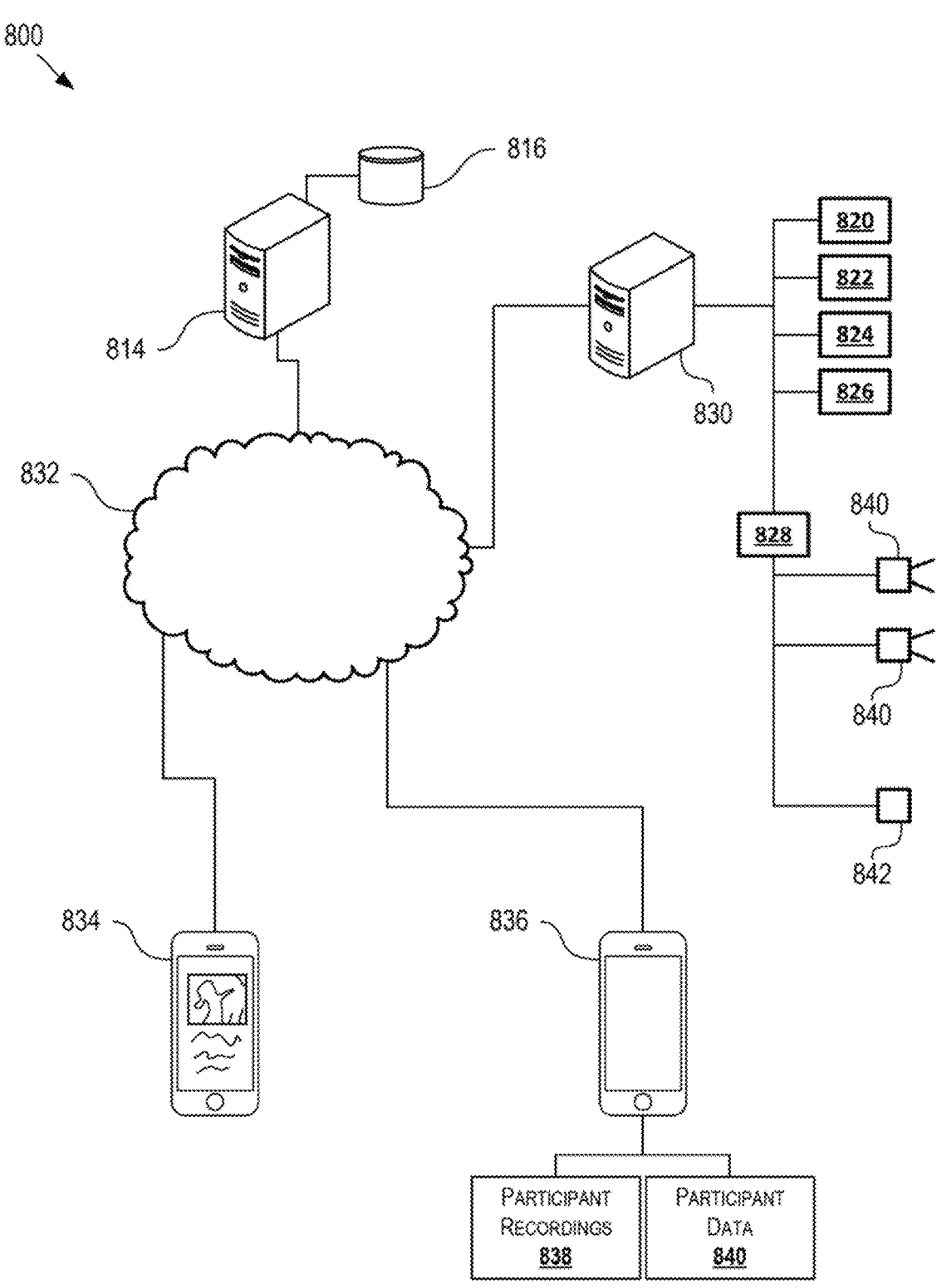
FIG. 8 is a schematic diagram depicting a media management system according to certain aspects of the present disclosure

FIG. 8 is a schematic diagram depicting a media management system 800 according to certain aspects of the present disclosure. Server 814 can be an example of server 214 of FIG. 2. Server 814 can include a data storage 816 and can be accessible through a network 832, such as a wide area network, such as the Internet or a cloud. A venue computer 830 can be coupled to the network 832 to communicate with the server 814 to share various information as described herein. In some cases, a venue computer 830 can be coupled to computers 820, 822, 824, 826, 828, which may each be associated with an activity in the venue (e.g., similar to computers 220, 222, 224, 226, 228 of FIG. 2). In some cases, computers 820, 822, 824, 826, 828 can relay information to the server 814 through the venue computer 830, although that need not be the case. Computer 828 is depicted as being coupled to two cameras 840 and a sensor 842 (e.g., a heartrate sensor or a sensor associated with a timer). Computer 828 can receive photo and/or video data through cameras 840 and can receive other data through sensor 842.

Each of the computers 820, 822, 824, 826, 828, 830 can be coupled to any number of cameras and other sensors similar to those depicted for computer 828.

Through the network 832, server 814 can be accessible to retrieve photo, video, and/or other data. A participant device 836 is depicted in FIG. 8 as a smartphone, although any other suitable device can be used, such as a personal computer, a tablet, a kiosk (e.g., at a venue or at a partner site), or the like. The participant can interact with the participant device 836 to access and/or download photo, video, and/or other data from the server 814, such as participant recordings 838 or other participant data 840. In some cases, the server 814 can provide participant recordings 838 as compilation video(s) or the like. In other cases, the server 814 can provide individual feeds from multiple cameras, allowing the participant to mix his or her own compilation video at a later time. In some cases, the participant can use the participant device 836 to interact with the server 814 to provide instructions or requests for how a compilation video or other product is to be generated.

In some cases, a spectator device 834 can be used to access server 814 through a network 832. The spectator device 834 can be any suitable device, such as a personal computer, a smartphone, a tablet, a kiosk, or the like. A spectator can access historical and/or live photo, video, and/or other data from a participant's engagement with one or more activities. For example, spectator device 834 is depicted showing a photo or video and displaying text, which can be automatically generated metrics and/or scores (e.g., current height up a rock climbing wall) for a participant engaging in an activity. In some cases, a spectator device 834 can access a particular participant's feed (e.g., live or historical) by providing a passcode, which can be supplied by the participant to the spectator.

Figure 9:
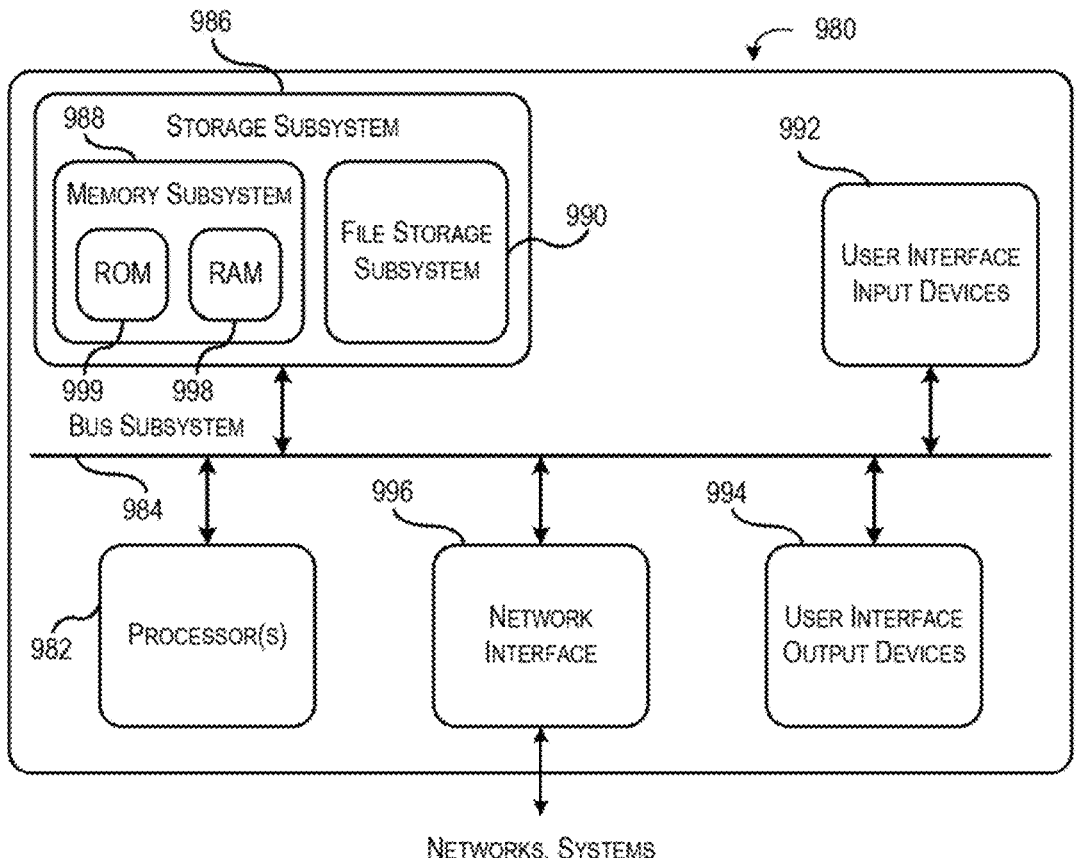
FIG. 9 is a simplified block diagram depicting a computer system that may incorporate components of various systems and devices described herein according to certain aspects of the present disclosure.

FIG. 9 is a simplified block diagram depicting a computer system 980 that may incorporate components of various systems and devices described herein according to certain aspects of the present disclosure. For example, computer system 980 can be a network device or a server as described herein, such as server 214 of FIG. 2, computers 230, 220, 222, 224, 226, 228 of FIG. 2, or devices 234, 236 of FIG. 2. In some cases, a computing device can incorporate some or all of the components of computer system 980. Computer system 980 may include one or more processors 982 that communicate with a number of peripheral subsystems via a bus subsystem 984. These peripheral subsystems may include a storage subsystem 986, including a memory subsystem 988 and a file storage subsystem 990, user interface input devices 992, user interface output devices 994, and a network interface subsystem 996.

Bus subsystem 984 can provide a mechanism for allowing the various components and subsystems of computer system 980 communicate with each other as intended. Although bus subsystem 984 is shown schematically as a single bus, in some cases, the bus subsystem may utilize multiple busses.

Processor 982, which can be implemented as one or more integrated circuits (e.g., a conventional microprocessor or microcontroller), controls the operation of computer system 980. One or more processors 982 may be provided. These processors may include single core or multicore processors. In some cases, processor 982 can execute a variety of programs in response to program code and can maintain multiple concurrently executing programs or processes. At any given time, some or all of the program code to be executed can be resident in processor(s) 982 and/or in storage subsystem 986. Through suitable programming, processor(s) 982 can provide various functionalities described above.

Network interface subsystem 996 provides an interface to other computer systems and networks. Network interface subsystem 996 serves as an interface for receiving data from and transmitting data to other systems from computer system 980. For example, network interface subsystem 996 may enable computer system 980 to connect to one or more devices via the Internet. In some cases, network interface 996 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some cases, network interface 996 can provide wired network connectivity (e.g., Ethernet) in addition to or instead of a wireless interface.

User interface input devices 992 may include a keyboard, pointing devices such as a mouse or trackball, a touchpad or touch screen incorporated into a display, a scroll wheel, a click wheel, a dial, a button, a switch, a keypad, audio input devices, microphones, eye gaze systems, and other types of input devices. In general, use of the term "input device" is intended to include all possible types of devices and mechanisms for inputting information to computer system 980. For example, in many smartphones, user input devices 992 may include one or more buttons provided by the smartphone, a touchscreen which may display a software keyboard, a digital peripheral interface, a built-in microphone, and the like.

User interface output devices 994 may include a display subsystem, indicator lights, or non-visual displays such as audio output devices, etc. The display subsystem may be a cathode ray tube (CRT), a flat-panel device such as a liquid crystal display (LCD), a projection device, a touch screen, and the like. In general, use of the term "output device" is intended to include all possible types of devices and mechanisms for outputting information from computer system 980. For example, a software keyboard may be displayed using a flat-panel screen.

Storage subsystem 986 provides a computer-readable storage medium for storing the basic programming and data constructs that provide the functionality of various aspects disclosed herein. Storage subsystem 986 can be implemented, e.g., using disk, flash memory, or any other storage media in any combination, and can include volatile and/or non-volatile storage as desired. Software (programs, code modules, instructions) that when executed by a processor provide the functionality described above may be stored in storage subsystem 986. These software modules or instructions may be executed by processor(s) 982. Storage subsystem 986 may also provide a repository for storing data used in accordance with the present invention. Storage subsystem 986 may include memory subsystem 988 and file/disk storage subsystem 990.

Memory subsystem 988 may include a number of memories including a main random access memory (RAM) 998 for storage of instructions and data during program execution and a read only memory (ROM) 999 in which fixed instructions are stored. File storage subsystem 990 may provide persistent (non-volatile) memory storage for program and data files, and may include a hard disk drive, a floppy disk drive along with associated removable media, a Compact Disk Read Only Memory (CD-ROM) drive, an optical drive, removable media cartridges, and other like memory storage media.

Computer system 980 can be of various types including a personal computer, a portable device (e.g., a smartphone, tablet, or the like), a workstation, a network computer, a mainframe, a kiosk, a server or any other data processing system. Due to the ever-changing nature of computers and networks, the description of computer system 980 depicted in FIG. 9 is intended only as a specific example. Many other configurations having more or fewer components than the system depicted in FIG. 9 are possible.

Figure 10:
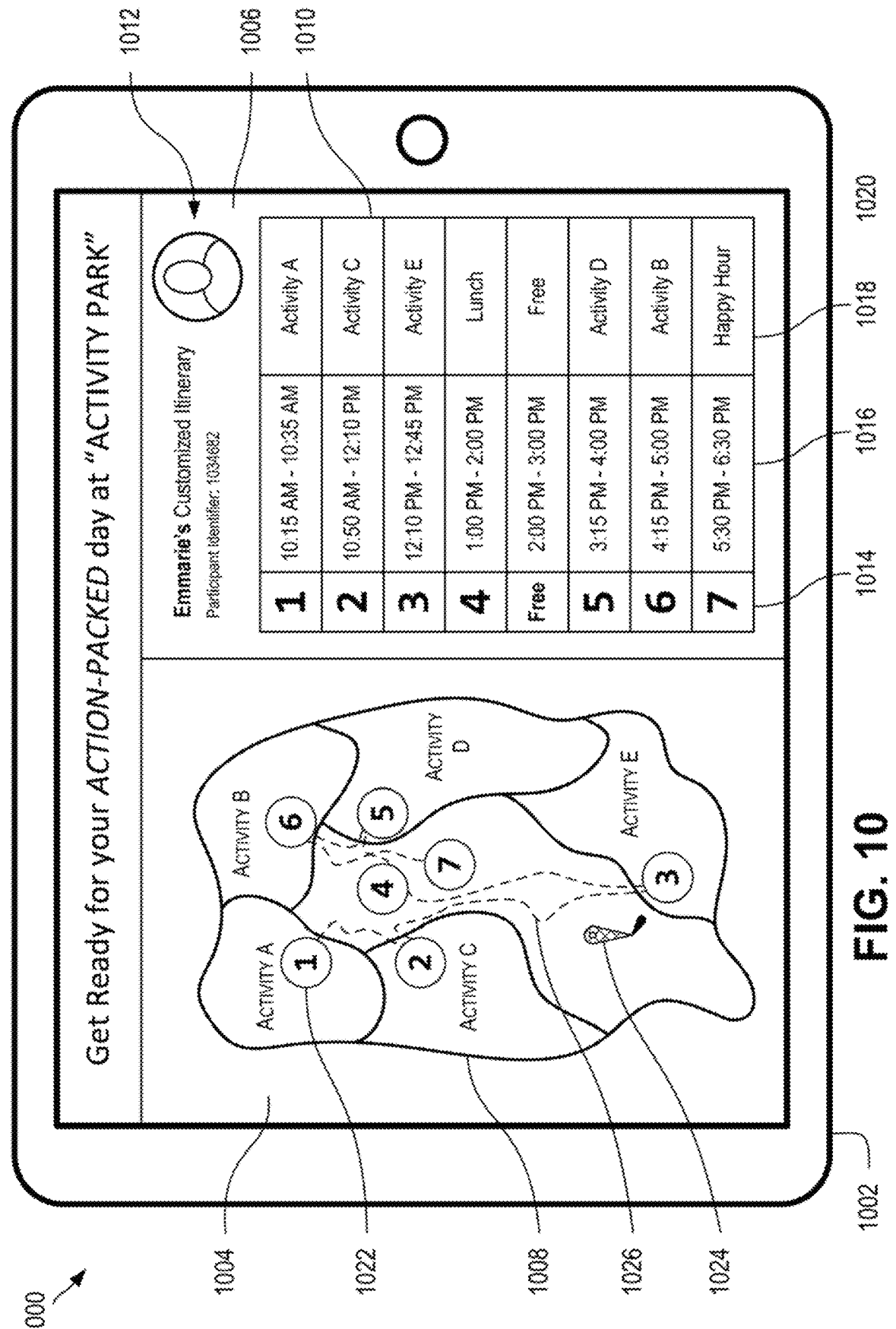
FIG. 10 is a schematic diagram depicting a customized itinerary display on a computing device according to certain aspects of the present disclosure.

FIG. 10 is a schematic diagram depicting a customized itinerary display 1000 on a computing device 1002 according to certain aspects of the present disclosure. The computing device 1002 can be any suitable computing device, such as a tablet computer, smartphone, kiosk, or other computing device. The customized itinerary display 1000 can display information about a participant's customized itinerary. In some cases, the customized itinerary display 1000 can be interactive and can permit editing, updating, or otherwise interacting with the participant's customized itinerary.

In some cases, the customized itinerary display 1000 can include a map portion 1004 and a schedule portion 1006. The map portion 1004 can display a map 1008 of the venue, which can include any number of activities. The schedule portion 1006 can display schedule information related to the participant's customized itinerary.

In FIG. 10, the schedule portion 1006 can display participant information 1012 (e.g., a name, participant identifier, photo or avatar, or other appropriate information). The schedule portion 1006 can display a schedule 1010, which can present the various items on the participant's itinerary in sequential order. The schedule 1010 can include any suitable information for a number of itinerary items, such as an itinerary item number 1014, a time slot 1016, a activity name 1018, and an optional activity logo. In some cases, the schedule 1010 can include only scheduled activities, although in some cases the schedule 1010 can include free time slots. In some cases, the schedule 1010 can display suggested activities for the participant, such as suggested activities the participant may enjoy and/or activities located nearby existing itinerary items that also have open time slots.

The map portion 1004 can include a customized map 1008 with indicators 1022 for one or more of the activities and/or itinerary items on the itinerary. Each indicator 1022 can be associated with an activity and/or itinerary item, such as by displaying a numeral or other identifier associated with the itinerary item number 1014 of the activity. In some cases, the indicators 1022 and itinerary item numbers 1014 can be sequential ordinal numbers that are associated with the sequential order of activities and/or itinerary items on the customized itinerary. Each indicator 1022 can be presented on the customized map 1008 at a location associated with an entrance, starting point, queue, or other location associated with the associated activity. Thus, a participant can glance at the customized map 1008 and indicators 1022 to rapidly ascertain the participant's planned path throughout the venue. In some cases, indicators 1022 can include other visually perceptive features (e.g., small clocks, color coding, size, shading, emphasis) that can be indicative of the order or time slot associated with the activity indicated by the indicator 1022. In some cases, indicators 1022 and itinerary item numbers 1014 can be dynamically updated as the participant completes each activity and/or as time passes, such that the next immediate activity and/or itinerary item is associated with a particular number (e.g., 1 or 2).

In some cases, the customized map 1008 can also present a participant location indicator 1024 showing a participant's current location in the venue. In some cases, the customized map 1008 can also present one or more path overlays 1026 indicative of a general path a participant may take between activities and/or itinerary items.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a system, comprising: one or more data processors; and a non-transitory computer-readable storage medium containing instructions which, when executed on the one or more data processors, cause the one or more data processors to perform operations including: detecting, using a participant identification system, a participant identifier associated with a participant attempting to engage in an activity at a multi-activity venue; determining that the participant is permitted to access the activity using the detected participant identifier; receiving scoring information associated with the participant's engagement in the activity; automatically correlating the scoring information with the participant identifier; and storing the correlated scoring information and participant identifier.

Example 2 is the system of example(s) 1, wherein receiving scoring information comprises automatically initiating a scoring system and automatically receiving scoring information from a set of scoring sensors.

Example 3 is the system of example(s) 1 or 2, wherein the operations further comprise: automatically recording media data associated with the participant's engagement in the activity; automatically correlating the recorded media data with the participant identifier; and storing the correlated recorded media data and participant identifier.

Example 4 is the system of example(s) 3, wherein automatically correlating the recorded media data with the participant identifier further comprises automatically correlating the recorded media data with the scoring information and storing the correlated recorded media data with the scoring information.

Example 5 is the system of example(s) 4, wherein the operations further comprise automatically editing the recorded media data using the scoring information.

Example 6 is the system of example(s) 3-5, wherein automatically recording media data associated with the participant's engagement in the activity comprises automatically switching between a plurality of recording devices during the participant's engagement with the activity, wherein automatically switching between the plurality of recording devices comprises selecting a desirable recording device from the plurality of recording devices based on received sensor input.

Example 7 is the system of example(s) 1-6, wherein determining that the participant is permitted to access the activity comprises using the detected participant identifier to initiate a payment associated with engagement in the activity.

Example 8 is the system of example(s) 1-7, wherein determining that the participant is permitted to access the activity comprises accessing a reservation system to confirm that a reservation exists that is associated with the participant identifier and the activity for a given time.

Example 9 is the system of example(s) 1-8, wherein the operations further comprise: accessing a customization database and retrieving participant customizations using the participant identifier; and customizing the participant's engagement in the activity using the participant customizations.

Example 10 is the system of example(s) 1-9, wherein the activity is a sport.

Example 11 is the system of example(s) 1-10, wherein the activity is a skill-based or ability-based activity.

Example 12 is a computer-implemented method, comprising: detecting, using a participant identification system, a participant identifier associated with a participant attempting to engage in an activity at a multi-activity venue; determining that the participant is permitted to access the activity using the detected participant identifier; receiving scoring information associated with the participant's engagement in the activity; automatically correlating the scoring information with the participant identifier; and storing the correlated scoring information and participant identifier.

Example 13 is the method of example(s) 12, wherein receiving scoring information comprises automatically initiating a scoring system and automatically receiving scoring information from a set of scoring sensors.

Example 14 is the method of example(s) 12 or 13, further comprising: automatically recording media data associated with the participant's engagement in the activity; automatically correlating the recorded media data with the participant identifier; and storing the correlated recorded media data and participant identifier.

Example 15 is the method of example(s) 14, wherein automatically correlating the recorded media data with the participant identifier further comprises automatically correlating the recorded media data with the scoring information and storing the correlated recorded media data with the scoring information.

Example 16 is the method of example(s) 15, further comprising automatically editing the recorded media data using the scoring information.

Example 17 is the method of example(s) 14-16, wherein automatically recording media data associated with the participant's engagement in the activity comprises automatically switching between a plurality of recording devices during the participant's engagement with the activity, wherein automatically switching between the plurality of recording devices comprises selecting a desirable recording device from the plurality of recording devices based on received sensor input.

Example 18 is the method of example(s) 12-17, wherein determining that the participant is permitted to access the activity comprises using the detected participant identifier to initiate a payment associated with engagement in the activity.

Example 19 is the method of example(s) 12-18, wherein determining that the participant is permitted to access the activity comprises accessing a reservation system to confirm that a reservation exists that is associated with the participant identifier and the activity for a given time.

Example 20 is the method of example(s) 12-19, further comprising: accessing a customization database and retrieving participant customizations using the participant identifier; and customizing the participant's engagement in the activity using the participant customizations.

Example 21 is the method of example(s) 12-20, wherein the activity is a sport.

Example 22 is the method of example(s) 12-21, wherein the activity is a skill-based or ability-based activity.

Example 23 is a computer-program product tangibly embodied in a non-transitory machine-readable storage medium, including instructions configured to cause a data processing apparatus to perform operations including: detecting, using a participant identification system, a participant identifier associated with a participant attempting to engage in an activity at a multi-activity venue; determining that the participant is permitted to access the activity using the detected participant identifier; receiving scoring information associated with the participant's engagement in the activity; automatically correlating the scoring information with the participant identifier; and storing the correlated scoring information and participant identifier.

Example 24 is the computer-program product of example(s) 23, wherein receiving scoring information comprises automatically initiating a scoring system and automatically receiving scoring information from a set of scoring sensors.

Example 25 is the computer-program product of example(s) 23 or 24, wherein the operations further comprise: automatically recording media data associated with the participant's engagement in the activity; automatically correlating the recorded media data with the participant identifier; and storing the correlated recorded media data and participant identifier.

Example 26 is the computer-program product of example(s) 25, wherein automatically correlating the recorded media data with the participant identifier further comprises automatically correlating the recorded media data with the scoring information and storing the correlated recorded media data with the scoring information.

Example 27 is the computer-program product of example(s) 26, wherein the operations further comprise automatically editing the recorded media data using the scoring information.

Example 28 is the computer-program product of example(s) 25-27, wherein automatically recording media data associated with the participant's engagement in the activity comprises automatically switching between a plurality of recording devices during the participant's engagement with the activity, wherein automatically switching between the plurality of recording devices comprises selecting a desirable recording device from the plurality of recording devices based on received sensor input.

Example 29 is the computer-program product of example(s) 23-28, wherein determining that the participant is permitted to access the activity comprises using the detected participant identifier to initiate a payment associated with engagement in the activity.

Example 30 is the computer-program product of example(s) 23-29, wherein determining that the participant is permitted to access the activity comprises accessing a reservation system to confirm that a reservation exists that is associated with the participant identifier and the activity for a given time.

Example 31 is the computer-program product of example(s) 23-30, wherein the operations further comprise: accessing a customization database and retrieving participant customizations using the participant identifier; and customizing the participant's engagement in the activity using the participant customizations.

Example 32 is the computer-program product of example(s) 23-31, wherein the activity is a sport.

Example 33 is the computer-program product of example(s) 23-32, wherein the activity is a skill-based or ability-based activity.

Example 34 is a system, comprising: one or more data processors; and a non-transitory computer-readable storage medium containing instructions which, when executed on the one or more data processors, cause the one or more data processors to perform operations including: receiving preferences associated with participation in one or more of a plurality of activities at a multi-activity venue, wherein the preferences are associated with a participant; automatically generating an itinerary using the received preferences, wherein the itinerary comprises reservations for the plurality of activities; associating the itinerary with a participant identifier associated with the participant; storing the itinerary, wherein storing the itinerary comprises using the reservations to reserve time slots associated with the plurality of activities at the multi-activity venue; receiving a request to participate in one of the plurality of activities during one of the time slots, wherein the request to participate includes the participant identifier; and approving the request to participate, wherein approving the request to participate comprises determining, using the itinerary, that the participant identifier is associated with the one of the time slots and the one of the plurality of activities.

Example 35 is the system of example(s) 34, wherein automatically generating the itinerary comprises scheduling a first activity immediately before a subsequent activity, wherein an exit of the first activity is associated with an entrance to the subsequent activity.

Example 36 is the system of example(s) 34 or 35, wherein automatically generating the itinerary comprises scheduling a first activity immediately before a subsequent activity, wherein equipment used during participation in the first activity is also used in participation in the subsequent activity.

Example 37 is the system of example(s) 34-36, wherein the participant identifier is associated with a team having a plurality of participants, wherein an existing itinerary is associated with at least one of the plurality of participants, and wherein automatically generating the itinerary comprises accessing the existing itinerary.

Example 38 is the system of example(s) 34-37, wherein the operations further comprise: identifying a proposed modification to the itinerary; transmitting a request to modify the itinerary based on the proposed modification; receiving an approval associated with the request to modify the itinerary; and updating the itinerary with the proposed modification upon receiving the approval.

Example 39 is a computer-implemented method, comprising: receiving preferences associated with participation in one or more of a plurality of activities at a multi-activity venue, wherein the preferences are associated with a participant; automatically generating an itinerary using the received preferences, wherein the itinerary comprises reservations for the plurality of activities; associating the itinerary with a participant identifier associated with the participant; storing the itinerary, wherein storing the itinerary comprises using the reservations to reserve time slots associated with the plurality of activities at the multi-activity venue; receiving a request to participate in one of the plurality of activities during one of the time slots, wherein the request to participate includes the participant identifier; and approving the request to participate, wherein approving the request to participate comprises determining, using the itinerary, that the participant identifier is associated with the one of the time slots and the one of the plurality of activities.

Example 40 is the method of example(s) 39, wherein automatically generating the itinerary comprises scheduling a first activity immediately before a subsequent activity, wherein an exit of the first activity is associated with an entrance to the subsequent activity.

Example 41 is the method of example(s) 39 or 40, wherein automatically generating the itinerary comprises scheduling a first activity immediately before a subsequent activity, wherein equipment used during participation in the first activity is also used in participation in the subsequent activity.

Example 42 is the method of example(s) 39-41, wherein the participant identifier is associated with a team having a plurality of participants, wherein an existing itinerary is associated with at least one of the plurality of participants, and wherein automatically generating the itinerary comprises accessing the existing itinerary.

Example 43 is the method of example(s) 39-42, further comprise: identifying a proposed modification to the itinerary; transmitting a request to modify the itinerary based on the proposed modification; receiving an approval associated with the request to modify the itinerary; and updating the itinerary with the proposed modification upon receiving the approval.

Example 44 is a computer-program product tangibly embodied in a non-transitory machine-readable storage medium, including instructions configured to cause a data processing apparatus to perform operations including:

receiving preferences associated with participation in one or more of a plurality of activities at a multi-activity venue, wherein the preferences are associated with a participant; automatically generating an itinerary using the received preferences, wherein the itinerary comprises reservations for the plurality of activities; associating the itinerary with a participant identifier associated with the participant; storing the itinerary, wherein storing the itinerary comprises using the reservations to reserve time slots associated with the plurality of activities at the multi-activity venue; receiving a request to participate in one of the plurality of activities during one of the time slots, wherein the request to participate includes the participant identifier; and approving the request to participate, wherein approving the request to participate comprises determining, using the itinerary, that the participant identifier is associated with the one of the time slots and the one of the plurality of activities.

Example 45 is the computer-program product of example(s) 44, wherein automatically generating the itinerary comprises scheduling a first activity immediately before a subsequent activity, wherein an exit of the first activity is associated with an entrance to the subsequent activity.

Example 46 is the computer-program product of example(s) 44 or 45, wherein automatically generating the itinerary comprises scheduling a first activity immediately before a subsequent activity, wherein equipment used during participation in the first activity is also used in participation in the subsequent activity.

Example 47 is the computer-program product of example(s) 44-46, wherein the participant identifier is associated with a team having a plurality of participants, wherein an existing itinerary is associated with at least one of the plurality of participants, and wherein automatically generating the itinerary comprises accessing the existing itinerary.

Example 48 is the computer-program product of example(s) 44-47, wherein the operations further comprise: identifying a proposed modification to the itinerary; transmitting a request to modify the itinerary based on the proposed modification; receiving an approval associated with the request to modify the itinerary; and updating the itinerary with the proposed modification upon receiving the approval.

What is claimed is:

1. A system, comprising:
   one or more data processors; and
   a non-transitory computer-readable storage media containing instructions which, when executed on the one or more data processors, cause the one or more data processors to perform operations comprising:
      detecting, using a plurality of participant identification systems at a plurality of locations of a multi-activity venue, a participant identifier associated with a participant, wherein detecting the participant identifier at the plurality of locations indicates participant engagement with a plurality of activities at the plurality of locations, wherein the plurality of activities are distinct with respect to each other;
      receiving first data comprising a plurality of media items obtained from a plurality of computer systems associated with the plurality of activities at the multi-activity venue, wherein each media item of the plurality of media items is associated with the participant identifier and corresponds to the participant engagement with the plurality of activities at the multi-activity venue;
      receiving second data comprising a plurality of metrics obtained from the plurality of computer systems, wherein each metric of the plurality of metrics is associated with the participant identifier and represents performance data of the participant collected during the participant engagement with the plurality of activities at the multi-activity venue, wherein the performance data is distinct with respect to each activity of the plurality of activities;
      generating a media compilation based at least in part on the plurality of media items and the plurality of metrics;
      receiving, from a participant device, a participant request to access the media compilation; and
      providing, to the participant device, access to the media compilation based at least in part on the participant request.

2. The system of claim 1, wherein the non-transitory computer-readable storage media contain additional instructions which, when executed on the one or more data processors, cause the one or more data processors to perform additional operations comprising receiving, from the participant device, participant instructions for generating the media compilation, and wherein generating the media compilation is based at least in part on the participant instructions.

3. The system of claim 1, wherein providing, to the participant device, access to the media compilation comprises enabling the participant device to download and save the media compilation.

4. The system of claim 1, wherein the non-transitory computer-readable storage media contain additional instructions which, when executed on the one or more data processors, cause the one or more data processors to perform additional operations comprising receiving second data comprising sensor data obtained from the plurality of computer systems associated with the plurality of activities at the multi-activity venue, wherein the sensor data is associated with the participant identifier.

5. The system of claim 4, wherein generating the media compilation is based at least in part on the sensor data.

6. The system of claim 1, wherein the non-transitory computer-readable storage media contain additional instructions which, when executed on the one or more data processors, cause the one or more data processors to perform additional operations comprising:
      receiving, from a spectator device, a spectator request to access the first data associated with the participant identifier; and
      providing, to the spectator device, access to the first data based at least in part on the spectator request.

7. The system of claim 6, wherein providing access to the first data comprises providing the first data and the second data for presentation at the spectator device.

8. The system of claim 6, wherein the spectator request is a request to access the media compilation, and wherein the media compilation comprises a participant feed corresponding to a particular participant engagement in a particular activity of the plurality of activities, and wherein the non-transitory computer-readable storage media contain additional instructions which, when executed on the one or more data processors, cause the one or more data processors to perform additional operations comprising:
      receiving, from the spectator device, a passcode corresponding to the participant feed; and
      providing access to the participant feed based at least in part on the passcode.

9. A computer-implemented method, comprising:
      detecting, using a plurality of participant identification systems at a plurality of locations of a multi-activity venue, a participant identifier associated with a participant, wherein detecting the participant identifier at the plurality of locations indicates participant engagement with a plurality of activities at the plurality of locations, wherein the plurality of activities are distinct with respect to each other;

receiving first data comprising a plurality of media items obtained from a plurality of computer systems associated with the plurality of activities at the multi-activity venue, wherein each media item of the plurality of media items is associated with the participant identifier and corresponds to the participant engagement with the plurality of activities at the multi-activity venue;

receiving second data comprising a plurality of metrics obtained from the plurality of computer systems, wherein each metric of the plurality of metrics is associated with the participant identifier and represents performance data of the participant collected during the participant engagement with the plurality of activities at the multi-activity venue, wherein the performance data is distinct with respect to each activity of the plurality of activities;

generating a media compilation based at least in part on the plurality of media items and the plurality of metrics;

receiving, from a participant device, a participant request to access the media compilation; and providing, to the participant device, access to the media compilation based at least in part on the participant request.

10. The computer-implemented method of claim 9, wherein the media compilation comprises a compilation video based at least in part on the plurality of media items.

11. The computer-implemented method of claim 9, further comprising receiving, from the participant device, participant instructions for generating the media compilation, and wherein generating the media compilation is based at least in part on the participant instructions.

12. The computer-implemented method of claim 9, wherein providing, to the participant device, access to the media compilation comprises enabling the participant device to download and save the media compilation.

13. The computer-implemented method of claim 9, further comprising receiving second data comprising sensor data obtained from the plurality of computer systems associated with the plurality of activities at the multi-activity venue, wherein the sensor data is associated with the participant identifier.

14. The computer-implemented method of claim 13, wherein generating the media compilation is based at least in part on the sensor data.

15. The computer-implemented method of claim 9, further comprising:

receiving, from a spectator device, a spectator request to access the first data associated with the participant identifier; and providing, to the spectator device, access to the first data based at least in part on the spectator request.

16. The computer-implemented method of claim 15, wherein providing access to the first data comprises providing the first data and the second data for presentation at the spectator device.

17. The computer-implemented method of claim 15, wherein the spectator request is a request to access the media compilation, and wherein the media compilation comprises a participant feed corresponding to a particular participant engagement in a particular activity of the plurality of activities, and wherein the method further comprises:

receiving, from the spectator device, a passcode corresponding to the participant feed; and providing access to the participant feed based at least in part on the passcode.

18. A computer-program product tangibly embodied in a non-transitory machine-readable storage medium, including instructions configured to cause a data processing apparatus to perform operations comprising:

detecting, using a plurality of participant identification systems at a plurality of locations of a multi-activity venue, a participant identifier associated with a participant, wherein detecting the participant identifier at the plurality of locations indicates participant engagement with a plurality of activities at the plurality of locations, wherein the plurality of activities are distinct with respect to each other;

receiving first data comprising a plurality of media items obtained from a plurality of computer systems associated with the plurality of activities at the multi-activity venue, wherein each media item of the plurality of media items is associated with the participant identifier and corresponds to the participant engagement with the plurality of activities at the multi-activity venue;

receiving second data comprising a plurality of metrics obtained from the plurality of computer systems, wherein each metric of the plurality of metrics is associated with the participant identifier and represents performance data of the participant collected during the participant engagement with the plurality of activities at the multi-activity venue, wherein the performance data is distinct with respect to each activity of the plurality of activities;

generating a media compilation based at least in part on the plurality of media items and the plurality of metrics;

receiving, from a participant device, a participant request to access the media compilation; and providing, to the participant device, access to the media compilation based at least in part on the participant request.

* * * * *